US011341271B2

(12) United States Patent
Chen et al.

(10) Patent No.: US 11,341,271 B2
(45) Date of Patent: May 24, 2022

(54) INFORMATION BARRIERS FOR SENSITIVE INFORMATION

(71) Applicant: Microsoft Technology Licensing, LLC, Redmond, WA (US)

(72) Inventors: Jinghua Chen, Redmond, WA (US); Avinash G. Pillai, Redmond, WA (US); Jovin Vasanth Kumar Deva Sahayam Arul Raj, Redmond, WA (US); Dhanasekaran Raju, Bellevue, WA (US); Apsara Karen Selvanayagam, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 25 days.

(21) Appl. No.: 16/875,555

(22) Filed: May 15, 2020

(65) Prior Publication Data

US 2020/0380167 A1    Dec. 3, 2020

Related U.S. Application Data

(60) Provisional application No. 62/854,868, filed on May 30, 2019, provisional application No. 62/854,839, filed on May 30, 2019.

(51) Int. Cl.
*H04L 29/06*       (2006.01)
*G06F 21/62*       (2013.01)
(Continued)

(52) U.S. Cl.
CPC ........ *G06F 21/6254* (2013.01); *G06F 21/604* (2013.01); *H04L 9/0643* (2013.01); *G06F 2221/2149* (2013.01)

(58) Field of Classification Search
CPC .............. G06F 21/6254; G06F 21/604; G06F 2221/2149; H04L 9/0643; H04L 9/0894; H04L 2209/42; H04L 63/0245
See application file for complete search history.

(56) References Cited

U.S. PATENT DOCUMENTS 7,653,573 B2    1/2010  Hayes et al.
7,849,213 B1   12/2010  Borghetti
(Continued)

FOREIGN PATENT DOCUMENTS

WO      2012138804 A2   10/2012

OTHER PUBLICATIONS

"Non Final Office Action Issued in U.S. Appl. No. 16/696,961", dated Mar. 25, 2021, 46 Pages.
(Continued)

*Primary Examiner* — Carl G Colin
*Assistant Examiner* — Andrew Suh
(74) *Attorney, Agent, or Firm* — Schwegman Lundberg & Woessner, P.A.

(57) ABSTRACT

Disclosed are embodiments for information barriers that are conditional on the type of information being communicated. Information barrier polices provided by the disclosed embodiments selectively allow communication between accounts or groups based on characteristics of the content of the communication. For example, communication between a marketing department and an engineering department may be conditional on the communication not including any sensitive information. The determination of whether the communication includes sensitive information is further designed to provide good performance even in environments that maintain substantial portions of data in an offsite or cloud environment, where latencies associated with searching large datastores can be prohibitive.

20 Claims, 30 Drawing Sheets

(51) Int. Cl.
  *G06F 21/60* (2013.01)
  *H04L 9/06* (2006.01)

(56) References Cited

U.S. PATENT DOCUMENTS

| | | |
|---|---|---|
| 7,899,867 B1 | 3/2011 | Sherstinsky et al. |
| 8,239,473 B2 | 8/2012 | Pulfer et al. |
| 8,255,370 B1 | 8/2012 | Zoppas et al. |
| 8,644,461 B2 | 2/2014 | Ramanathan et al. |
| 8,667,269 B2 | 3/2014 | Schibuk |
| 8,677,508 B2 | 3/2014 | Sasaki |
| 8,972,589 B2 | 3/2015 | Roese et al. |
| 8,990,882 B1 | 3/2015 | Koshy et al. |
| 9,053,344 B2 | 6/2015 | Arasaratnam et al. |
| 9,177,174 B1 | 11/2015 | Shoemaker et al. |
| 9,197,617 B1 | 11/2015 | Millwood et al. |
| 9,219,735 B2 | 12/2015 | Hoard et al. |
| 9,219,752 B2 | 12/2015 | Balinsky et al. |
| 9,473,532 B2 | 10/2016 | Pearl et al. |
| 9,485,205 B2 | 11/2016 | Bansal et al. |
| 9,489,657 B2 | 11/2016 | Chudge et al. |
| 9,654,510 B1 | 5/2017 | Pillai et al. |
| 9,680,876 B2 | 6/2017 | Porras |
| 9,781,581 B1 | 10/2017 | Capella et al. |
| 9,805,204 B1 | 10/2017 | Nachenberg |
| 9,852,309 B2 | 12/2017 | Luria |
| 9,898,619 B1 * | 2/2018 | Hadsall ............... G09G 5/003 |
| 10,013,566 B2 | 7/2018 | Meyer et al. |
| 10,114,965 B2 * | 10/2018 | Lim ................... H04L 63/1425 |
| 2006/0277592 A1 | 12/2006 | Brown et al. |
| 2007/0123287 A1 | 5/2007 | Mock et al. |
| 2010/0186091 A1 | 7/2010 | Turner et al. |
| 2011/0055911 A1 | 3/2011 | Adelman et al. |
| 2012/0072969 A1 | 3/2012 | Aratsu et al. |
| 2014/0026195 A1 | 1/2014 | Marshall |
| 2014/0032670 A1 | 1/2014 | Ellingson et al. |
| 2015/0248384 A1 | 9/2015 | Luo et al. |
| 2015/0286831 A1 | 10/2015 | More et al. |
| 2015/0382197 A1 | 12/2015 | Ren et al. |
| 2016/0283879 A1 | 9/2016 | Behrendt et al. |
| 2017/0359306 A1 | 12/2017 | Thomas et al. |
| 2017/0359314 A1 * | 12/2017 | Mathias ............. H04L 63/0428 |
| 2018/0107834 A1 | 4/2018 | Erofeev et al. |
| 2018/0145986 A1 | 5/2018 | Chien |
| 2018/0196953 A1 | 7/2018 | More et al. |
| 2018/0204213 A1 * | 7/2018 | Zappier ................... H04L 63/10 |
| 2018/0212903 A1 | 7/2018 | Rose et al. |
| 2018/0234256 A1 * | 8/2018 | Bowen ................ H04L 63/0823 |
| 2018/0234459 A1 | 8/2018 | Kung et al. |
| 2018/0276378 A1 | 9/2018 | Ray et al. |
| 2018/0293400 A1 * | 10/2018 | Borup ..................... H04L 67/06 |
| 2019/0081787 A1 | 3/2019 | Bayar et al. |
| 2019/0228186 A1 | 7/2019 | Atreya et al. |
| 2020/0382677 A1 | 12/2020 | Chen et al. |

OTHER PUBLICATIONS

Kongsgard, "Policy-Based Labelling: A Flexible Framework for Trusted Data Labelling", In Proceedings of the International Conference on Military Communications and Information Systems, May 18, 2015, 10 Pages.

"International Search Report and Written Opinion issued in PCT Application No. PCT/US2020/026583", dated Jun. 22, 2020, 16 Pages.

"International Search Report and Written Opinion issued in PCT Application No. PCT/US2020/033267", dated Jul. 6, 2020, 14 Pages.

"New-Address☐List", Retrieved From: https://docs.microsoft.com/en-us/powershell/module/exchange/new-addresslist?view=exchange-ps, Retrieved From: Dec. 14, 2020, 25 Pages.

Davis, Chris, "Connect to Exchange Online Protection PowerShell", Retrieved From: https://docs.microsoft.com/en-us/powershell/exchange/connect-to-exchange-online-protection-powershell?view=exchange-ps, Nov. 21, 2020, 7 Pages.

Davis, Chris, "Filterable properties for the Recipient Filter parameter on Exchange cmdlets", Retrieved From: https://docs.microsoft.com/en-us/powershell/exchange/recipientfilter-properties?view=exchange-ps, Oct. 7, 2020, 19 Pages.

Fox, et al., "Create a custom sensitive information type in Security & Compliance Center PowerShell", Retrieved From: https://docs.microsoft.com/en-us/microsoft-365/compliance/create-a-custom-sensitive-information-type-in-scc-powershell?view=o365-worldwide, Sep. 12, 2020, 37 Pages.

Murray, et al., "Combine Multiple Requests in one HTTP call using JSON Batching", Retrieved From https://docs.microsoft.com/en-us/graph/json-batching, Aug. 12, 2020, 6 Pages.

"Notice of Allowance Issued in U.S. Appl. No. 16/696,961", dated Jul. 21, 2021, 10 Pages.

* cited by examiner

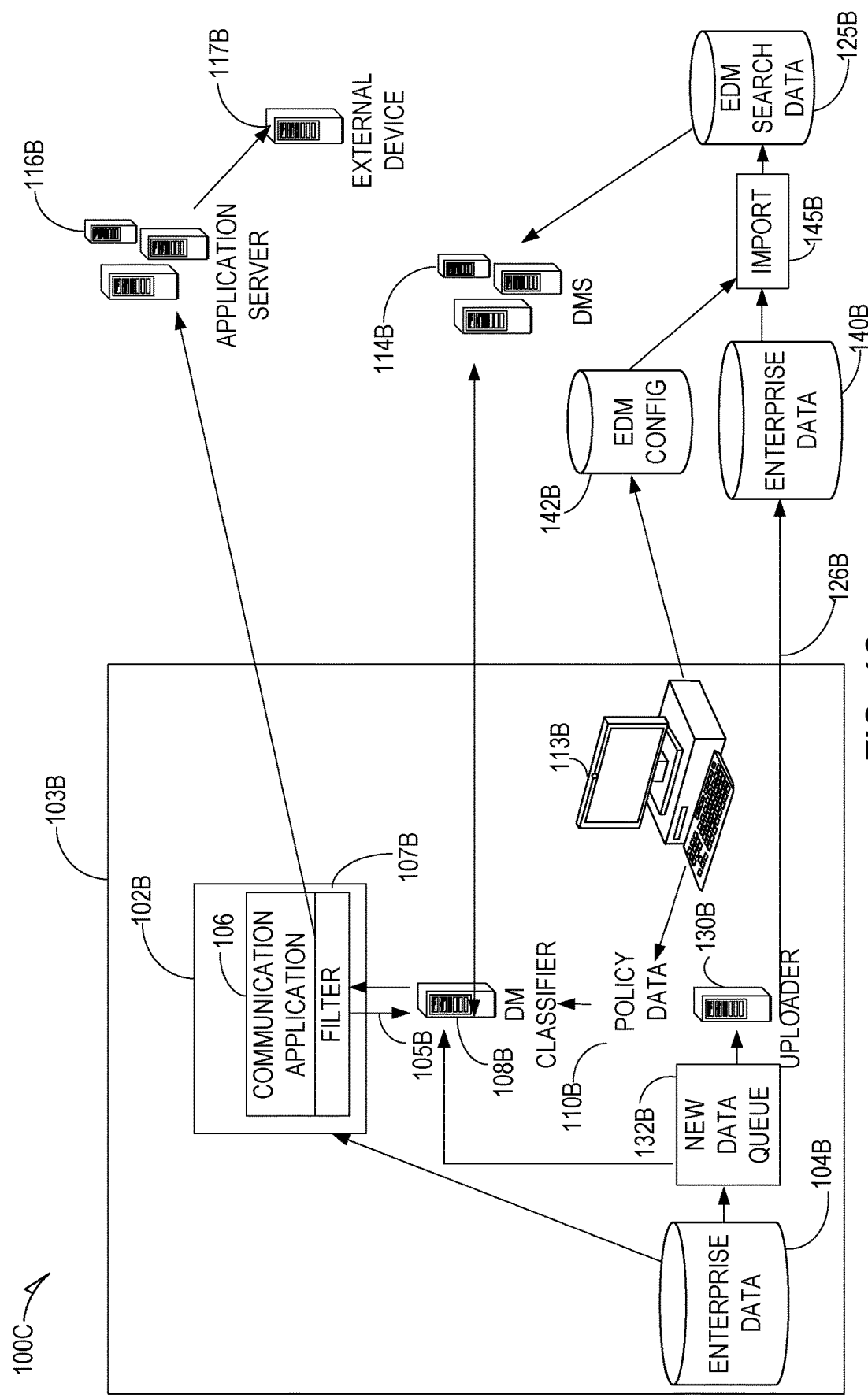

| NEW DLP POLICY | CHOOSE LOCATIONS | | | ✕ |
|---|---|---|---|---|
| ⊘ CHOOSE THE INFORMATION TO PROTECT | STATUS | LOCATION | INCLUDE *404* | EXCLUDE *406* |
| ⊘ NAME YOUR POLICY | ◯ | 🛒 EXCHANGE MAIL *402A* | ALL | NONE |
| ○ CHOOSE LOCATIONS | | | CHOOSE DISTRIBUTION GROUPS | EXCLUDE DISTRIBUTION GROUPS |
| ○ POLICY SETTINGS | ◯ | 🛒 SHAREPOINT SITES *402B* | | |
| ○ REVIEW YOUR SETTINGS | ◯ | 👤 ONEDRIVE ACCOUNTS *402C* | | |
| | BACK | NEXT | CANCEL | |

EDM RULE
NAME   CONDITIONS   EXCEPTION   USER MODIFICATIONS   USER OVERRIDES   INCIDENT REPORTS

≪ CONDITIONS

WE'LL APPLY THIS POLICY TO CONTENT THAT MATCHES THESE CONDITIONS

CONTENT CONTAINS

| ANY OF THESE ≫ | | | INSTANCE COUNT | | MATCH ACCURACY | |
| --- | --- | --- | --- | --- | --- | --- |
| SENSITIVE INFO TYPE | | | MIN | MAX | MIN | MAX |
| EXACT MATCH CUSTOMER CREDIT CARD — 504 | | | 1 | ANY | 90 | 100 |
| ADD | ≫ | | | 506 | | 508 |

✚ ADD GROUP — 510

✚ ADD A CONDITION ≫ — 512

≫ EXCEPTIONS

≫ ACTIONS

≪ USER NOTIFICATIONS

USE NOTIFICATIONS TO INFORM YOUR USERS AND HELP EDUCATE THEM ON THE PROPER USE OF SENSITIVE INFO.
◯ ON
EMAIL NOTIFICATIONS
⦿ NOTIFY THE USER WHO SENT, SHARED, OR LAST MODIFIED THE CONTENT.
◯ NOTIFY THESE PEOPLE:
☐ CUSTOMIZE THE EMAIL TEXT
POLICY TIPS
☑ CUSTOMIZE THE POLICY TIP TEXT

EXACT MATCH WITH CUSTOMER CREDIT CARD.

*FIG. 5*

NEW DLP POLICY

| | |
|---|---|
| ⊘ | CHOOSE THE INFORMATION TO PROTECT |
| ⊘ | NAME YOUR POLICY |
| ○ | CHOOSE LOCATIONS |
| ○ | POLICY SETTINGS |
| ○ | REVIEW YOUR SETTINGS |

DO YOU WANT TO TURN ON THE POLICY OR TEST THINGS OUT FIRST?

DO YOU WANT TO TURN ON THE POLICY OR TEST THINGS OUT FIRST?

KEEP IN MIND THAT AFTER YOU TURN IT ON, IT'LL TAKE UP TO AN HOUR FOR THE POLICY TO TAKE EFFECT.

○ YES, TURN IT ON RIGHT AWAY —602A

● I'D LIKE TO TEST IT OUT FIRST —602B
  ☑ SHOW POLICY TIPS WHILE IN TEST MODE.

○ NO, KEEP IT OFF. I'LL TURN IT ON LATER. —602C

[BACK]  [NEXT]    [CANCEL]

INFORMATION BARRIERS - SECURITY &

INCOGNITO

- HOME
- ALERTS
- PERMISSIONS
- CLASSIFICATIONS
- INFORMATION BARRIERS
- DATA LOSS PREVENTION
- RECORDS MANAGEMENT
- DATA GOVERNANCE
- SUPERVISION
- THREAT MANAGEMENT
- MAIL FLOW

HOME > INFORMATION BARRIERS

USE INFORMATION BARRIER POLICIES TO CONTROL COMMUNICATIONS IN MICROSOFT TEAMS BETWEEN TWO GROUPS OF PEOPLE.
LEARN MORE ABOUT INFORMATION BARRIERS

| POLICIES | POLICY APPLICATION |

+ CREATE POLICY    ⟳ REFRESH

| CREATION TIME | START TIME | END TIME | STATUS | PROGRESS |
|---|---|---|---|---|
| ☐ APR 4, 2019 10:17:52 PM | APR 4, 2019 10:17:52 PM | APR 4, 2019 11:02:06 PM | COMPLETED | 100 — 1802A |
| ☐ MAR 19, 2019 10:17:52 PM | MAR 19, 2019 10:17:52 PM | MAR 19, 2019 9:55:25 PM | COMPLETED | 100 — 1802B |
| ☐ MAR 15, 2019 6:23:05 PM | MAR 15, 2019 6:23:05 PM | MAR 15, 2019 6:55:38 PM | COMPLETED | 100 |
| ☐ MAR 15, 2019 6:19:43 PM | MAR 15, 2019 6:19:43 PM | MAR 15, 2019 6:21:31 PM | CANCELLED | 0 |
| ☐ MAR 14, 2019 7:24:49 PM | MAR 14, 2019 7:24:49 PM | MAR 14, 2019 7:38:55 PM | COMPLETED | 100 |
| ☐ MAR 14, 2019 12:16:18 PM | MAR 14, 2019 12:16:18 PM | MAR 14, 2019 12:45:58 PM | CANCELLED | 0 |
| ☐ MAR 13, 2019 7:05:54 PM | MAR 13, 2019 7:05:54 PM | MAR 13, 2019 7:22:29 PM | COMPLETED | 100 |
| ☐ MAR 13, 2019 5:15:55 PM | MAR 13, 2019 5:15:55 PM | MAR 13, 2019 6:17:52 PM | COMPLETED | 100 |

*FIG. 18*

INFORMATION BARRIERS FOR SENSITIVE INFORMATION

CROSS REFERENCE TO RELATED APPLICATIONS

This application claims priority to U.S. Provisional Application No. 62/854,868, filed May 30, 2019 and entitled "Data Protection in Cloud Environments." This application also claims priority to U.S. Provisional Application No. 62/854,839, filed May 30, 2019 and entitled "Information Barriers Using Database Filters." The contents of both these prior applications are considered part of this application, and are hereby incorporated by reference in their entirety.

BACKGROUND

The ability of members of an organization to communicate with each other has been greatly enhanced with the advent of modern communication applications such as email, chat, texting, and web-based sharing. While this communication can, in some circumstances, enhance productivity of the organization, the improved ability to share information also brings with it associated risks. For example, confidential information is sometimes inappropriately shared with organizational members who do not necessarily understand the care necessary to safeguard the information. The information might then be disclosed in a manner that harms the organization. Similarly, knowledge gained by one organization (e.g. sales) from another (engineering), may change the behavior of that organization in a manner that is undesirable and not beneficial to the organization as a whole. For example, if a sales organization learns of an upcoming new product, the sales team may deemphasize the existing products in anticipation of the new product, resulting in reduced sales.

Data protection products reduce the risk that sensitive enterprise data is transmitted outside the enterprise under inappropriate circumstances. First generation data protection services operated by comparing intercepted network transmissions with on-premises data stores to identify the transmission of sensitive information. An appropriate policy is then applied to the data based on, for example, an account performing the transmission and the nature of the intercepted data and its level of sensitivity. As enterprises migrate their data to cloud environments, this on-premises comparisons of intercepted data with local data stores becomes less effective, given that some significant portion of enterprise data exists only in cloud-based data storage.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 1C is an overview of a network system, at least a portion of which is implemented by one or more of the disclosed embodiments.

FIG. 4 shows an example user interface that is implemented in one or more of the disclosed embodiments FIG. 5 shows an example user interface that is implemented in one or more of the disclosed embodiments.

FIG. 6 shows an example user interface that is implemented in one or more of the disclosed embodiments.

FIG. 16 shows an example user interface that is implemented in one or more of the disclosed embodiments.

FIG. 18 shows an example user interface that is implemented in one or more of the disclosed embodiments.

DETAILED DESCRIPTION

Figure 1A:
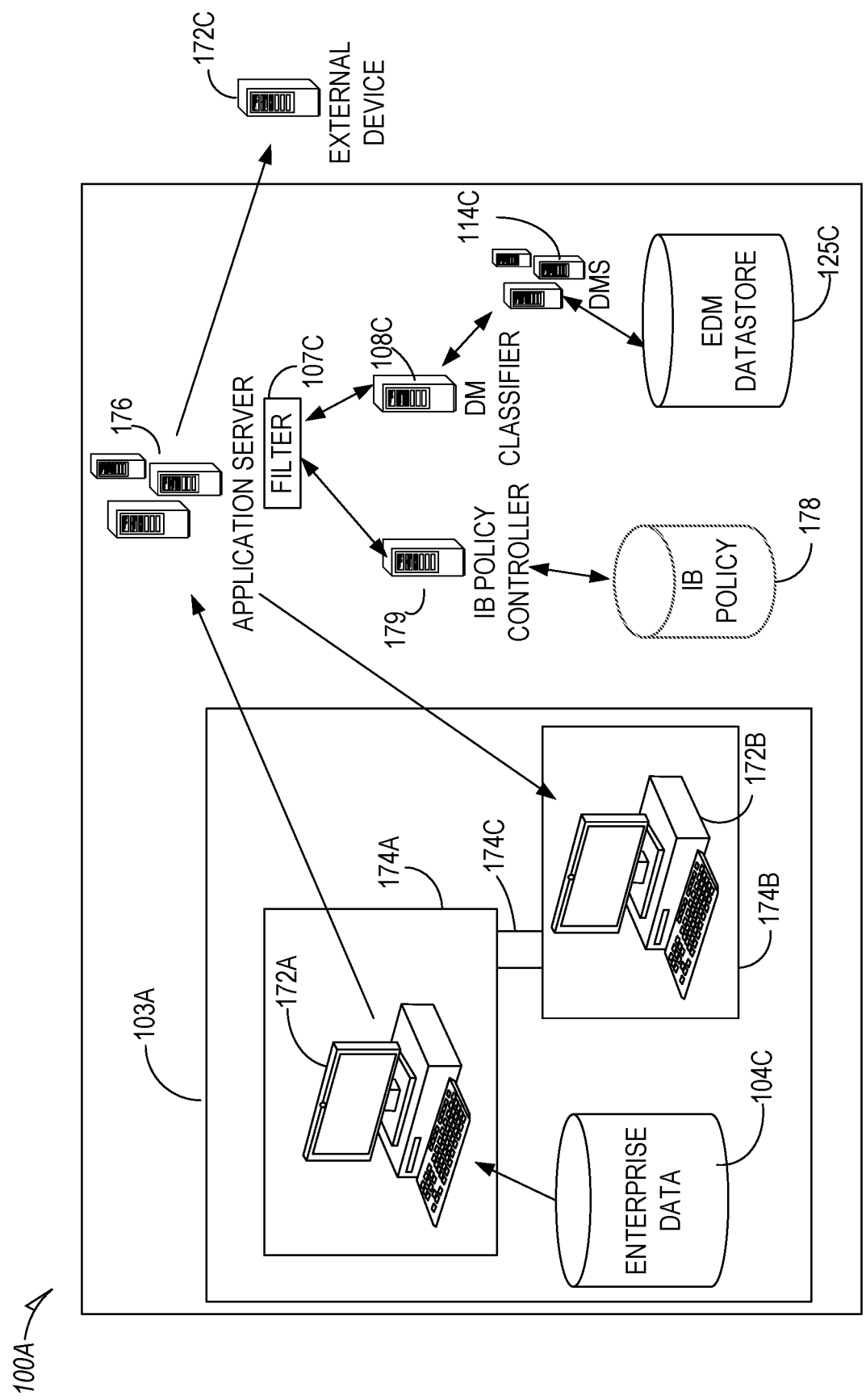
FIG. 1A is an overview of a network system, at least a portion of which is implemented by one or more of the disclosed embodiments.

The following description and the drawings sufficiently illustrate specific embodiments to enable those skilled in the art to practice them. Other embodiments may incorporate structural, logical, electrical, process, and other changes. Portions and features of some embodiments are included in, or substituted for, those of other embodiments. Embodiments set forth in the claims encompass all available equivalents of those claims.

The disclosed embodiments provide for information barrier policies that manage communication between two accounts or account groups conditioned on the nature of the communication. Past information barrier policies provided either an "all or nothing" approach to information barriers, with communication either allowed or prohibited between accounts and/or groups of accounts. This presented a technical problem in that it was impossible to provide for a flexible approach to communication management between two accounts or account groups. For example, with previous solutions, in order to prevent a flow of some types of communication between accounts or groups of accounts, these solutions required all communication to be shut down.

The disclosed embodiments solve this technical problem by providing a more nuanced approach. The proposed technical solution allows for particular types of communication between accounts or account groups to be allowed, while other types of communication are prohibited. Types in this contact can refer to a particular classification of content included in communication. For example, in some embodiments, communication of sensitive information (e.g. a first type) is prohibited between two individuals or groups, while communication of non-sensitive information (e.g. a second type) is allowed. Some embodiments provide for multiple classifications of information being communicated. For example, some embodiments classify information as sensitive (e.g. a first type), confidential (e.g. a second type), public (e.g. a third type), financially related (e.g. a fourth type), product related (e.g. a fifth type), or other classifications. The disclosed embodiments then provide for selective configuration of which types of information are allowed to be communicated between accounts or groups of accounts.

Some of the disclosed embodiments solve additional technical problems relating to cloud based data protection. These embodiments provide the selective communication described above while also improving data protection in cloud environments. In some aspects, data protection includes two portions, first, an on-premises portion and second, a remote or cloud-based portion. The on-premises portion analyzes network data intended for distribution outside a secure enterprise environment (e.g., a corporate intranet). The network data is analyzed against one or more heuristics to detect indications of sensitive information. For example, one heuristic may detect numbers arranged in a manner such that could be credit card information. Another heuristic may detect patterns that are similar to patterns included in one or more databases maintained by the enterprise. Because some portion of enterprise data is maintained in cloud-based implementations, it may not be practical for an on-premises solution to precisely identify a source of the data. Once an indication of sensitive information in the network data is detected via the on-premises scanning, a portion of the network data including the indication is sent to a data matching service (DMS). References below to a DMS refer to either a software service running on a computer, such as a computing device, or to both the software service and the computer running the software service. The DMS has access to a more comprehensive set of enterprise data, which may include data primarily located in cloud-based implementations, and thus not on-premises in comprehensive form.

In some other embodiments, both the heuristic analysis and exact data matching are performed off premises. In these embodiments, the heuristic analysis is still performed within a secure environment, with the secure environment extending from an on-premises environment to include a location of the heuristic analysis. For example, an off-premises portion of the secure environment could include a cloud-based email solution in use by an enterprise. In these embodiments, data stored within the cloud-based email application is considered to still be within a secure environment.

Upon receiving the portion of the network data, the DMS system compares the portion to the more comprehensive set of enterprise data and responds to the on-premises component with an indication of whether enterprise data matching the portion was identified. If an identification was made, the DMS further indicates whether the portion includes information deemed sensitive by the enterprise. The on-premises component then selectively allows the network data to be transmitted outside. The secure enterprise environment blocks said transmission if the network data is sensitive.

Some of the disclosed embodiments further account for data recently created on-premises. Such data is uploaded, in some embodiments, to the off premises DMS to provide for identification of that data when appropriate. Depending on implementation, there is a delay between the time the on-premises data is created and a completion of its transfer to the off-premises DMS environment. During this delay period, the off-premises DMS environment does not have a copy of the new data, and thus is unable to identify the new data as sensitive enterprise data if so requested. Thus, if an attempt is made to transfer the new data off-premises, during this delay period, the EMDS environment would fail to identify the data as enterprise data. To avoid this vulnerability, some of the disclosed embodiments may initially define newly created on-premises data to be restricted from transfer off-premises. This restriction may remain in place until the new data has been successfully transferred to the DMS environment.

In addition to providing a more flexible and document specific method of information barriers, and improved data protection in cloud environments, some of the disclosed embodiments provide for static configuration of segments and information barrier policies. During the static configuration, the queries defining segments are not evaluated, but instead are defined for later execution.

After configuration of segments and information barrier policies, the queries are executed to populate the segments with accounts selected by the respective queries. Permitted and excluded account lists for each account are then defined based on the populated segments and the information barrier policies. Once the permitted and/or excluded account lists are populated, the disclosed embodiments may then determine the presence or absence of an information barrier between two accounts in an efficient manner.

By populating the permitted and excluded account lists for each account before application of an information barrier policy to a particular communication between a first account and a second account, the execution can rely on the permitted and/or excluded lists to provide for more efficient execution than would be possible if the queries were dynamically executed in response to the particular communication.

FIG. 1A is an overview of a network system 100A, at least a portion of which is implemented by one or more of the disclosed embodiments. FIG. 1A shows a user terminal 172A and a user terminal 172B. A first account is logged into the user terminal 172A has access to data store 104C. The first account and user terminal 172A accesses the data store 104C when generating a message to be sent to a second account logged into user terminal 172B or a third destination account logged into an external device 172C. The network system 100A of FIG. 1A includes an application server 176 that provides communication services to the user terminals 172A-B. For example, the application server 176 runs, in some embodiments, an email system. In one example, the user terminal 172A constructs a communication (such as an email message) locally on the user terminal 172A and then sends the communication to the application server 176 for further processing, which can include forwarding of the communication to a destination account, such as the second account logged into the user terminal 172B or the third account logged into the external device 172C.

FIG. 1A shows that an information barrier policy exists that controls communication between user terminal 172A and user terminal 172B. The information barrier policy is collectively represented by the barriers 174A, 174B, and 174C. In the example of FIG. 1A, the information barrier policy indicates that some data can be communicated between the accounts logged into the user terminal 172A and user terminal 172B, but that sensitive information cannot be communicated between these accounts. The network system 100A implements such an information barrier policy via the application server 176, filter 107C, information barrier controller 179, and data match classifier 108C, as discussed further below.

The user terminal 172A constructs the communication and transmits the message to the application server 176. The application server 176 is configured to determine an information barrier policy that is to be applied to the communication between the first account logged into the user terminal 172A and the second account logged into the user terminal 172B. To determine the information barrier policy, the application server 176 is configured to communicate with a filter 107C, which interfaces with an information barrier controller 179. The information barrier controller 179 determines, based on an information policy data store 178, an appropriate policy to apply to the communication between the first account logged into the user terminal 172A and the second account logged into the user terminal 172B.

If the policy indicates that sensitive information cannot be passed between the first account and second account, but non-sensitive information can be communicated, the filter and/or the application server 176 then notifies a data match classifier 108C. The data match classifier 108C runs one or more heuristics (e.g. regular expressions or a machine learning model) on the message sent by the first account to the second account. If the heuristics indicate that the communication has indications of sensitive information, a determination has been made that a probability of the communication including sensitive information is above zero. However, the heuristics also generally cannot determine that the probability of sensitive information is 100%. Thus, additional processing is performed, at least in some embodiments, to determine whether in fact, the communication has a 100% probability of including sensitive information.

Thus, if the data match classifier 108C indicates sensitive information, the portion of the communication indicating sensitive information is then provided to a data matching service 114C. The data matching service compares the portion against the data store 125C to determine if there is a match. If the portion matches sensitive information included in the data store 125C, the data matching service 114C provides an indication of the match back to the filter 107C, which takes appropriate action with respect to the communication. The appropriate action can include blocking, allowing, or anonymizing portions of the communication to eliminate the sensitive information from the message.

Figure 1B:
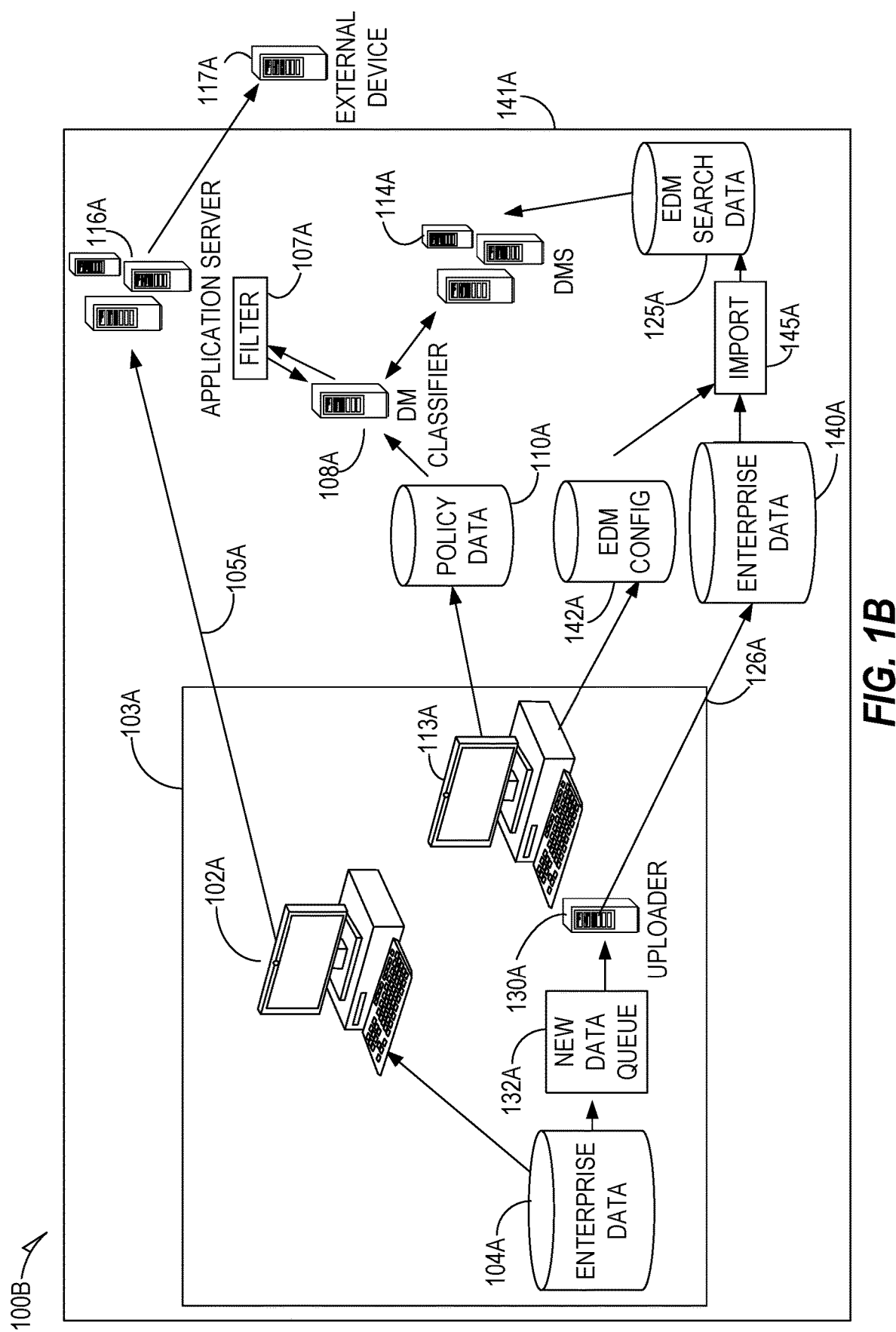
FIG. 1B is an overview of a network system, at least a portion of which is implemented by one or more of the disclosed embodiments.

FIG. 1B is an overview of a network system, at least a portion of which is implemented by one or more of the disclosed embodiments. The network system 100B includes an enterprise 103A, along with remote cloud-based IT resources such as the application servers 116A. The enterprise 103A includes a user terminal 102A. The user terminal 102A has access to enterprise data, including sensitive data stored in a data store 104A. As discussed above, the disclosed embodiments provide for monitoring and control of data leaving the enterprise 103A.

The user terminal 102A sends network data 105A to a remote application server(s) 116A. The remote application server(s) 116A includes a filter 107A, which intercepts the network data 105A sent to the remote application server(s) 116A. The user terminal 102A may send data to the remote application server(s) 116A for a variety of reasons. For example, the network data 105A is, in some embodiments, at least a portion of an email message, and the remote application server(s) 116A may implement an email application service. The network data 105A may alternatively represent a document being uploaded to a web site or remote storage that facilitates sharing of data among multiple users (e.g. Sharepoint™, Box™, etc). In these embodiments, the network data 105A is included, in some embodiments, in an HTTP Post type message.

Once the network data 105A has been transferred to the application server(s) 116A, it is at risk of being exposed outside the secure environment 141A. For example, in the case of the application server(s) 116A implementing an email application, the user terminal 102A may attempt to send the network data 105A as part of an email message to the external device 117A. In the case of the application server(s) 116A implementing a web site with sharing capability, once the network data 105A is made publicly available via the web site, it is at risk of being viewed by the external device 117A.

To determine whether the network data 105A includes data that is considered sensitive by the enterprise 103A, the filter 107A transmits the network data 105A to a data match classifier (DMC) 108A. The DMC 108A consults with policy data store 110A to perform one or more screening methods on the network data 105A.

Each of the one or more screening methods identify whether the network data 105A has one or more indications of sensitive information. The screening methods may perform a variety of analysis on the network data to determine whether the network data includes an indication of sensitive information. In some embodiments, the screening methods run by the DMC 108A may employ one or more of regular expression evaluation and/or keyword matching on the network data. Information defining the regular expressions and/or keywords to be identified in the network data is obtained, in some embodiments, by the DMC 108A from configuration information. In some aspects, regular expressions and/or keywords are policy specific. The policy is, in some embodiments, based on one or more of a time of day, user identifier, group identifier, or other parameters. The policy to apply to the network data 105A is, in some embodiments, obtained from the policy data store 110A. The policy information included in the policy data store 110A is, in some embodiments, configured via an administrative console 113A.

The disclosed embodiments may segment the network data into portions, and determine whether each individual portion includes indications of sensitive data. Thus, for example, if the network data 105A represents a single electronic document, that document is, in some embodiments, segmented into multiple portions, and the DMC 108A may determine whether each of the multiple portions includes an indication of sensitive information. While the screening methods do not determine with certainty whether the network data includes sensitive information, they provide an indication of a risk that sensitive information is included in the network data 105A.

The segmentation of the network data 105A is, in some embodiments, performed using a variety of techniques that may vary by embodiment. In some embodiments, the segmentation is, in some embodiments, performed according to size of a particular segment. For example, in these embodiments, each segment, except perhaps a last segment of the network data, is, in some embodiments, of equivalent size. Other embodiments may segment data based on contextual knowledge of the network data itself. For example, if the network data represents an electronic document, some embodiments may segment the network data consistent with boundaries with the electronic document, such as along page boundaries, paragraph boundaries, spreadsheet cell, row or column boundaries, or other contextual boundaries that vary by the particular electronic document encoded by the network data.

If a portion of the network data 105A is determined to present a risk of exposing sensitive information, the DMC 108A sends the portion to DMS 114A via a network, such as the Internet. The DMS 114A compares the received portion to data in the EDM search data store 125A.

The EDM search data store 125A is populated via data flow 126A from the data store 104A located within the enterprise 103A. In some embodiments, the data from the data store 104A to the EDM search data store 125A is, in some embodiments, provided by a data upload system 130A. For example, the data upload system 130A may hash or encrypt data in the data store 104A before uploading the data to the enterprise data store 140A. An import process 145A may further process the data before populating the EDM search data store 125A. The import process 145A that imports data from the enterprise data store 140A to the EDM search data store 125A is, in some embodiments, controlled by configuration information included in an exact data match configuration data store 142A, which is, in some embodiments, configured via user interfaces displayed on the administrative console 113A.

In addition to analysis of the network data 105A via one or more screening methods as discussed above, the DMC 108A is, in some embodiments, further configured to determine whether the network data 105A is waiting to be uploaded to the EDM search data store 125A. For example, the DMC 108A may check a new data queue 132A to determine if an upload of the network data 105A is pending. In these embodiments, new data created within the enterprise 103A is added to the data store 104A and also indicated in the new data queue 132A. Uploads from the data store 104A to the EDM search data store 125A is, in some embodiments, driven by data in the new data queue 132A by the data upload system 130A. In some embodiments, the data upload system 130A operates periodically, or at least at discrete intervals that introduce some delay between a time that new data is initially created and a time when that data has been successfully transferred to the EDM search data store 125A. During this delay, this new data is vulnerable to exposure by the user terminal 102A unless remedial measures are taken as described herein.

Thus, the DMC 108A may check the new data queue 132A to determine whether the network data 105A has already been uploaded and can therefore be successfully detected by the DMS 114A, or if the DMC 108A should ensure new data is not exposed by the user terminal 102A. To determine whether new data is restricted from exposure by the user terminal 102A, the DMC 108A may check indicators for the data include in the data store 104A. For example, the data store 104A may indicate whether a particular portion of network data 105A is restricted from exposure by the user terminal 102A. If the network data 105A is restricted, the DMC 108A may block transmission of the network data 105A outside the secure environment without consulting the DMS 114A. This capability is discussed in more detail below with respect to at least FIGS. 11-12.

FIG. 1C is an overview of a network system, at least a portion of which is implemented by one or more of the disclosed embodiments. The network system 100C includes an enterprise 103B (on-premises), along with remote cloud-based IT resources such as the application servers 116B. The enterprise 103B (on-premises) includes a user terminal 102B. The user terminal 102B has access to enterprise data, including sensitive data stored in an data store 104B. As discussed above, the disclosed embodiments provide for monitoring and control of data leaving the enterprise 103B.

The user terminal includes a communication application 106. The communication application 106 may include a filter 107B. The filter 107B monitors data accessed by the communication application 106. The communication application 106 may attempt to sends the data to a device external to the enterprise 103B, such as the external device 117B. The communication application 106 may attempt to send the data to the external device 117B for a variety of reasons. For example, the data is, in some embodiments, at least a portion of an email message, and the external device 117B is, in some embodiments, a device to receive the email. The data may alternatively represent a document being uploaded to a web site or remote storage that facilitates sharing of data among multiple users (e.g. Sharepoint™, Box™, etc). In these embodiments, the data is included in an HTTP Post type message.

Before the communication application 106 sends the data external to the enterprise 103B, the data is intercepted by a filter 107B integrated with the communication application 106. The filter 107B transmits network data 105B to a data match classifier (DMC) 108B. The DMC consults with policy data store 110B to perform one or more screening methods on the network data 105B.

Each of the one or more screening methods identify whether the network data 105B has one or more indications of sensitive information. The screening methods may perform a variety of analysis on the network data to determine whether the network data includes an indication of sensitive information. In some embodiments, the screening methods run by the DMC 108B may employ one or more of regular expression evaluation and/or keyword matching on the network data. Information defining the regular expressions and/or keywords to be identified in the network data is, in some embodiments, obtained by the DMC 108B from configuration information. In some aspects, regular expressions and/or keywords are policy specific. The policy is, in some embodiments, based on one or more of a time of day, user identifier, group identifier, or other parameters. The policy to apply to the network data 105B is, in some embodiments, obtained from the policy data store 110B. The policy information included in the policy data store 110B is, in some embodiments, configured via an administrative console 113B.

The disclosed embodiments may segment the network data into portions, and determine whether each individual portion includes indications of sensitive data. Thus, for example, if the network data 105B represents a single electronic document, that document is, in some embodiments, segmented into multiple portions, and the DMC 108B may determine whether each of the multiple portions includes an indication of sensitive information. While the screening methods do not determine with certainty whether the network data includes sensitive information, they provide an indication of a risk that sensitive information is included in the network data 105B.

The segmentation of the network data is performed using a variety of techniques that may vary by embodiment. In some embodiments, the segmentation is, in some embodiments, performed according to size of a particular segment. For example, in these embodiments, each segment, except perhaps a last segment of the network data, is, in some embodiments, of equivalent size. Other embodiments may segment data based on contextual knowledge of the network data itself. For example, if the network data represents an electronic document, some embodiments may segment the network data consistent with boundaries with the electronic document, such as along page boundaries, paragraph boundaries, spreadsheet cell, row or column boundaries, or other contextual boundaries that vary by the particular electronic document encoded by the network data.

If a portion of the network data 105B is determined to present a risk of exposing sensitive information, the DMC 108B sends the portion to DMS 114B via a network, such as the Internet. The DMS 114B compares the received portion to data in the EDM search data store 125B.

The EDM search data store 125B is populated via data flow 126B from the data store 104B located within the enterprise 103B. In some embodiments, the data from the data store 104B to the EDM search data store 125B is, in some embodiments, provided by a data upload system 130B. For example, the data upload system 130B may hash or encrypt data in the data store 104B before uploading the data to the enterprise data store 140B. An import process 145B may further process the data before populating the EDM search data store 125B. The import process 145B that imports data from enterprise data store 140B to the EDM search data store 125B is, in some embodiments, controlled by configuration information included in an exact data match configuration data store 142B, which is, in some embodiments, configured via user interfaces displayed on the administrative console 113B.

In addition to analysis of the network data 105B via one or more screening methods as discussed above, the DMC 108B is, in some embodiments, further configured to determine whether the network data 105B is waiting to be uploaded to the EDM search data store 125B. For example, the DMC 108B may check a new data queue 132B to determine if an upload of the network data 105B is pending. In these embodiments, new data created within the enterprise 103B is added to the data store 104 and also indicated in the new data queue 132B. Uploads from the data store 104B to the EDM search data store 125B is, in some embodiments, driven by data in the new data queue 132B by the data upload system 130B. In some embodiments, the data upload system 130B operates periodically, or at least at discrete intervals that introduce some delay between a time that new data is initially created and a time when that data has been successfully transferred to the EDM search data store 125B. During this delay, this new data is vulnerable to exposure by the user terminal 102B unless remedial measures are taken as described herein.

Thus, the DMC 108B may check the new data queue 132B to determine whether the network data 105B has already been uploaded and can therefore be successfully detected by the DMS 114B, or if the DMC 108B should ensure new data is not exposed by the user terminal 102B. To determine whether new data is restricted from exposure by the user terminal 102B, the DMC 108B may check indicators for the data include in the data store 104B. For example, the data store 104B may indicate whether a particular portion of data store 104B is restricted from exposure by the user terminal 102B. If the network data 105B is restricted, the DMC 108B may block transmission of the network data 105B outside the enterprise 103B without consulting the DMS 114B. This capability is discussed in more detail below with respect to at least FIGS. 11-12.

Figure 1D:
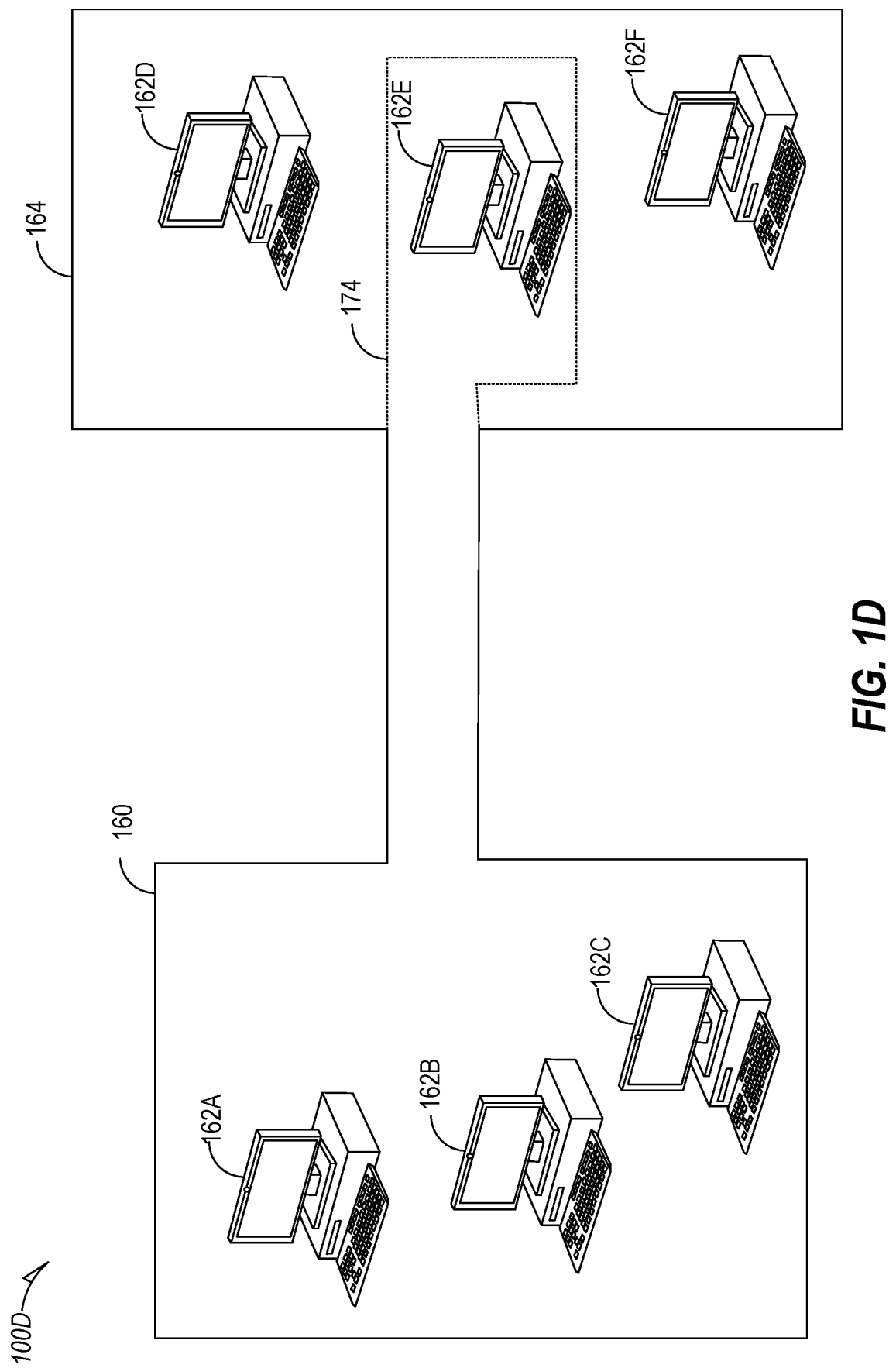
FIG. 1D is an overview diagram showing an example implementation of information barriers.

FIG. 1D is an overview diagram showing an example implementation 100D of information barriers. FIG. 1D shows three user terminals 162A-C. The three user terminals are surrounded by a first information barrier 160. The first information barrier 160 prevents the user terminals from communicating with devices outside the first information barrier 160. Thus, the user terminal 162A communicates with one or more of the user terminals 162B and/or 162C without interference from the first information barrier 160. Similarly, the user terminal 162B communicates with one or more of the user terminal 162A and/or 162C within interference from the first information barrier 160. The user terminal 162C communicates with either of the user terminal 162A and/or 162C without interference from the first information barrier 160.

FIG. 1D also shows three other user terminals 162D-F. The three user terminals 162D-F are almost completely surrounded by a second information barrier 164. The second information barrier 164 allows the three user terminals 162D-F to communicate with each other, but generally prevents other devices from communicating with any of the three user terminals 162D-F. Similarly, the second information barrier 164 prevents the three user terminals 162D-F from initiating communication with other devices besides the three user terminals 162D-F.

A third information barrier 174 is also shown. The third information barrier 174 provides communication between the three user terminals 162A-C and the user terminal 162E. Thus, via the third information barrier 174, the user terminal 162E may communicate with any of the user terminal 162A-C, and vis-versa. Thus, while the first information barrier 160 and second information barrier 164 generally prevent communication between the two groups of user terminals 162A-C and second information barrier 162D-F, the third information barrier 174 provides an exception to these barriers by allowing communication between the user terminal 162E and any one or more of the user terminals 162A-C.

Figure 1E:
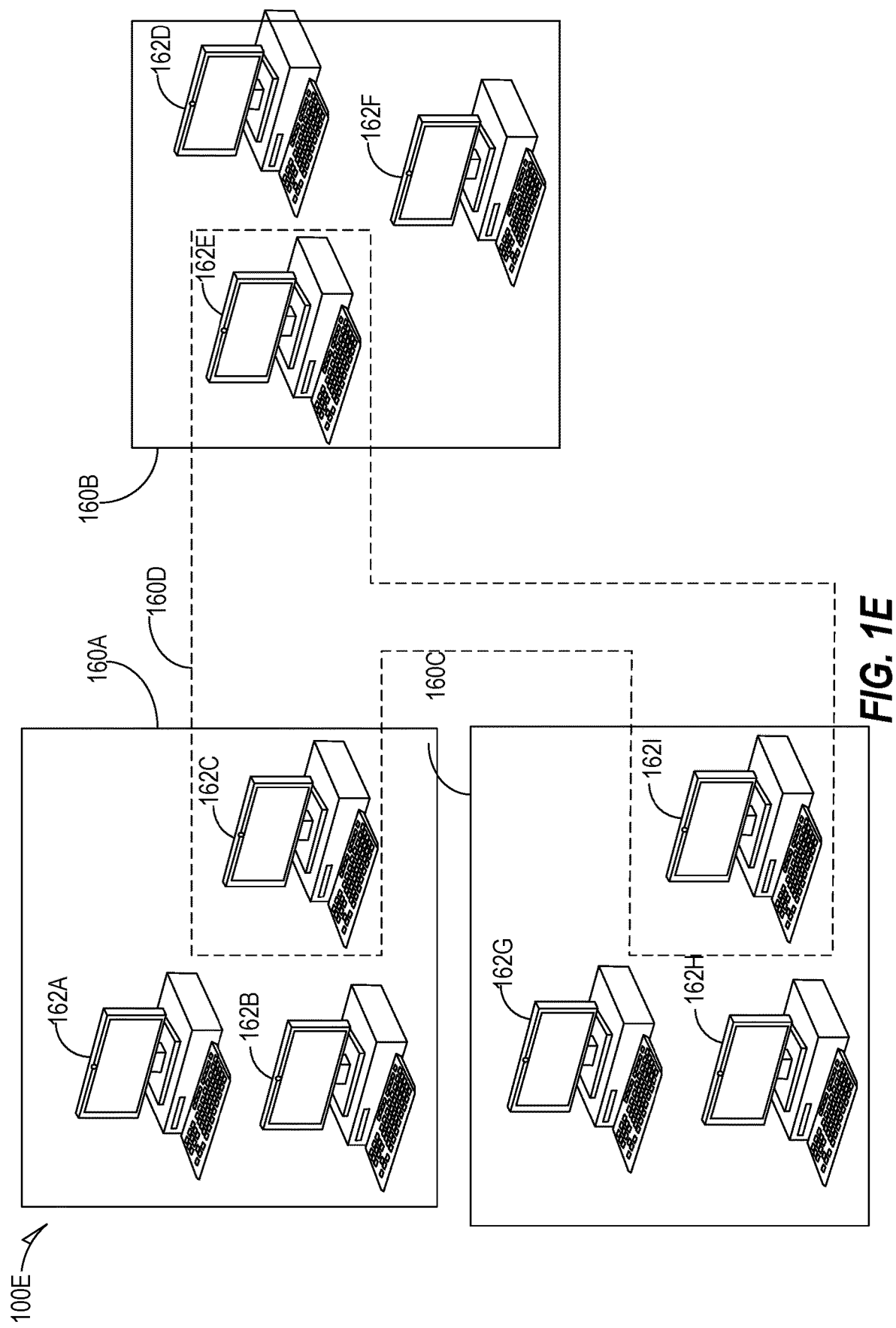
FIG. 1E is an overview diagram showing an example implementation of information barriers.

FIG. 1E shows a second example implementation 100E of information barriers. FIG. 1E shows three groups of user terminals, a first group of user terminals including user terminal 162A, user terminal 162B, and user terminal 162C, a second group of devices include device 162D, user terminal 162E, and user terminal 162F, and a third group of user terminals including user terminal 162G, user terminal 162H, and user terminal 162I, each of first three groups of user terminals protected by an information barrier 160A, information barrier 160B, or information barrier 160C respectively. A fourth information barrier 160D provides for communication between user terminals 162C, 162E, and 162I. Each of the user terminals 162C, 162E, and 162I are within the separate information barriers 160A-C, but may still communicate via the fourth information barrier 160D.

The disclosed embodiments provide for the illustrated information barriers. An information barrier defines how two groups of devices or user terminals communicate with each other. An information barrier between the two groups can entirely prevent communication between those devices, or can define that selective communications can be allowed, provided those communications meet certain criterion. Because information barriers may overlap, some of the disclosed embodiments provide for configuration of least restrictive or most restrictive options. For example, if a least restrictive option is configured, any one communication path between devices allows for such communication. If a most restrictive option is configured, any information barrier that blocks communication between two devices is enough to prevent communication between those devices, regardless of other information barriers that may facilitate such communication. Some aspects may provide for a prioritization of information barriers, such that barriers of higher priority take precedence over other barriers having lower priority.

Figure 2A:
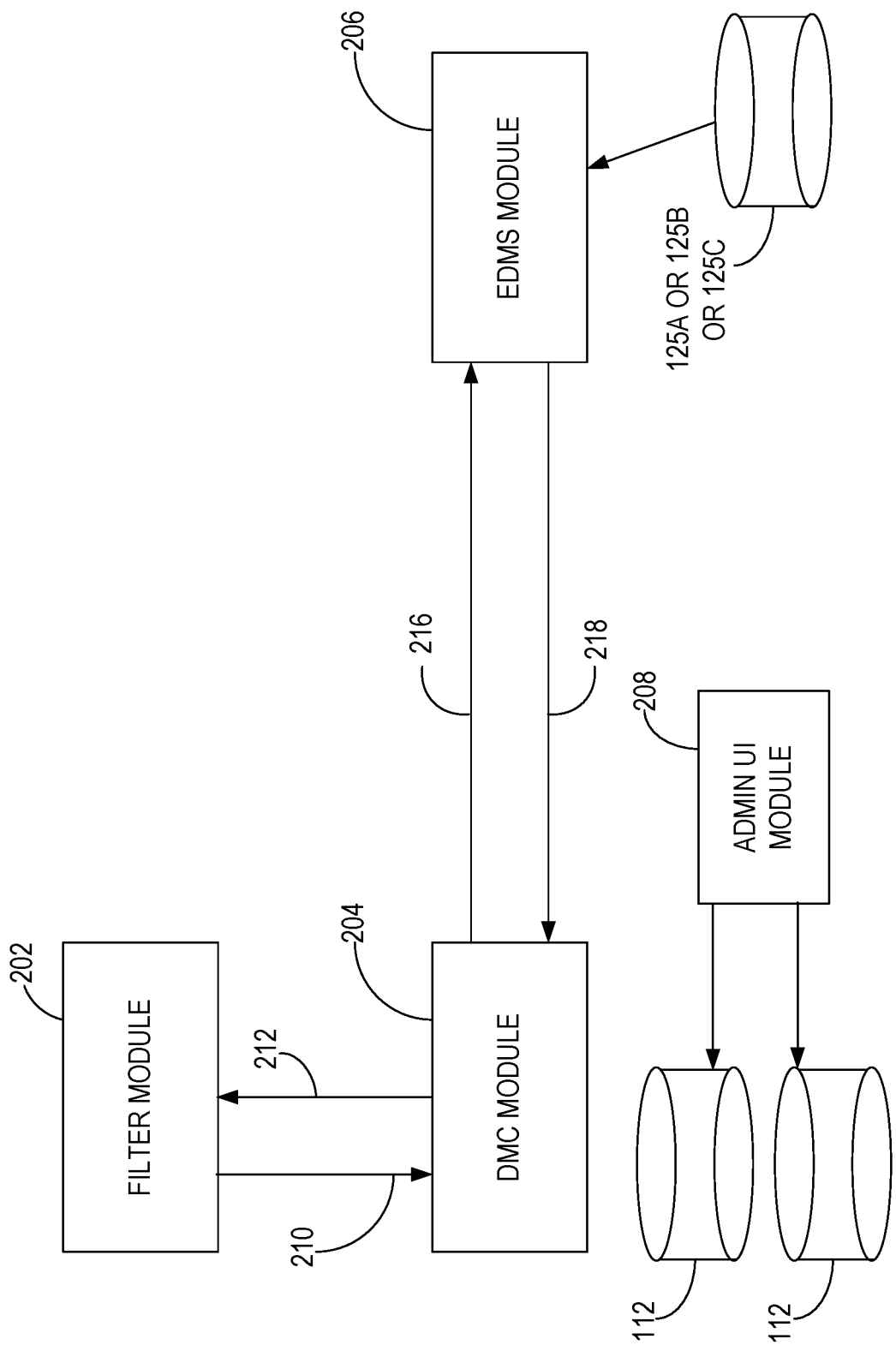
FIG. 2A is a block diagram showing a simplified view of components included in the network systems of FIGS. 1B and 1C.

FIG. 2A is a block diagram showing a simplified view of components included in the network system 100B of FIG. 1B and/or the network system 100C of FIG. 1C. FIG. 2A shows a filter module 202, DMC module 204, an DMS module 206, and an administrative user interface module 208. Each of the filter module 202, DMC module 204, DMS module 206, and administrative user interface module 208 may define or include instructions for hardware processing circuitry that configure the hardware processing circuitry to perform one or more of the functions discussed below and attributed to each of the filter module 202, DMC module 204, DMS module 206, and/or administrative user interface module 208. In some aspects, the filter module 202 may execute within the filter 107A or 107B discussed above with respect to FIGS. 1B and 1C respectively. In some aspects, the DMC module 204 may execute on the DMC 108A or 108B, discussed above with respect to FIG. 1B or FIG. 1C. In some aspects, the DMS module 206 may execute on the DMS 114A or 114B. In some aspects, the administrative user interface module 208 may execute on the administrative console 113A and/or 113B.

Consistent with the discussion of FIGS. 1B-C above, FIG. 2A shows network data 210 being transmitted from the filter module 202 to the DMC module 204. The DMC module 204 may perform one or more screening methods on the network data 210 to determine if the network data 210 includes indications of sensitive information. If the screening methods indicate sensitive information is, in some embodiments, included in the network data 210, the DMC module 204 sends a portion 216 of the network data 210 including the indication to the DMS module 206. The DMS module 206 performs an exact data match search against the EDM search data store 125A or 125B to determine if the portion includes sensitive information for the organization. In some embodiments, the exact data match search determines if the portion is exactly represented by a portion of the EDM search data store 125A or 125B. In other words, the exact data match search determines whether a copy of the portion received by the DMS module 206 is included in the EDM search data store 125A or 125B. In some other aspects, the exact data match search may determine a similarity score between the portion and a portion of the EDM search data store 125A or 125B. If the similarity score meets a criterion, a match is identified.

As discussed above, in some aspects, the EDM search data store 125A or 125B includes hashed or encrypted enterprise data, and thus the DMS module 206 may hash or encrypt the portion 216 before performing the comparison in some aspects.

After performing the exact data match comparison on the portion 216, the DMS module 206 sends a response 218 to the DMC module 204. The response 218 may indicate whether an exact data match between the portion 216 and data included in the EDM search data store 125A or 125B was found by the DMS module 206. The response 218 may further indicate a sensitivity level of the matching data in the EDM search data store 125A or 125B if a match was identified.

Upon receiving the response 218 from the DMS module 206, the DMC module 204 then indicates to the filter module 202 whether the network data 210 is allowed to pass out of the managed enterprise (e.g. 103) or is blocked from transmission. This indication is provided via a response message 212 to the filter module 202.

The administrative user interface module 208 includes instructions to implement one or more administrative user interface that provide for configuration of policy information (e.g. stored in the policy data store 110 and/or screening information.

Figure 2B:
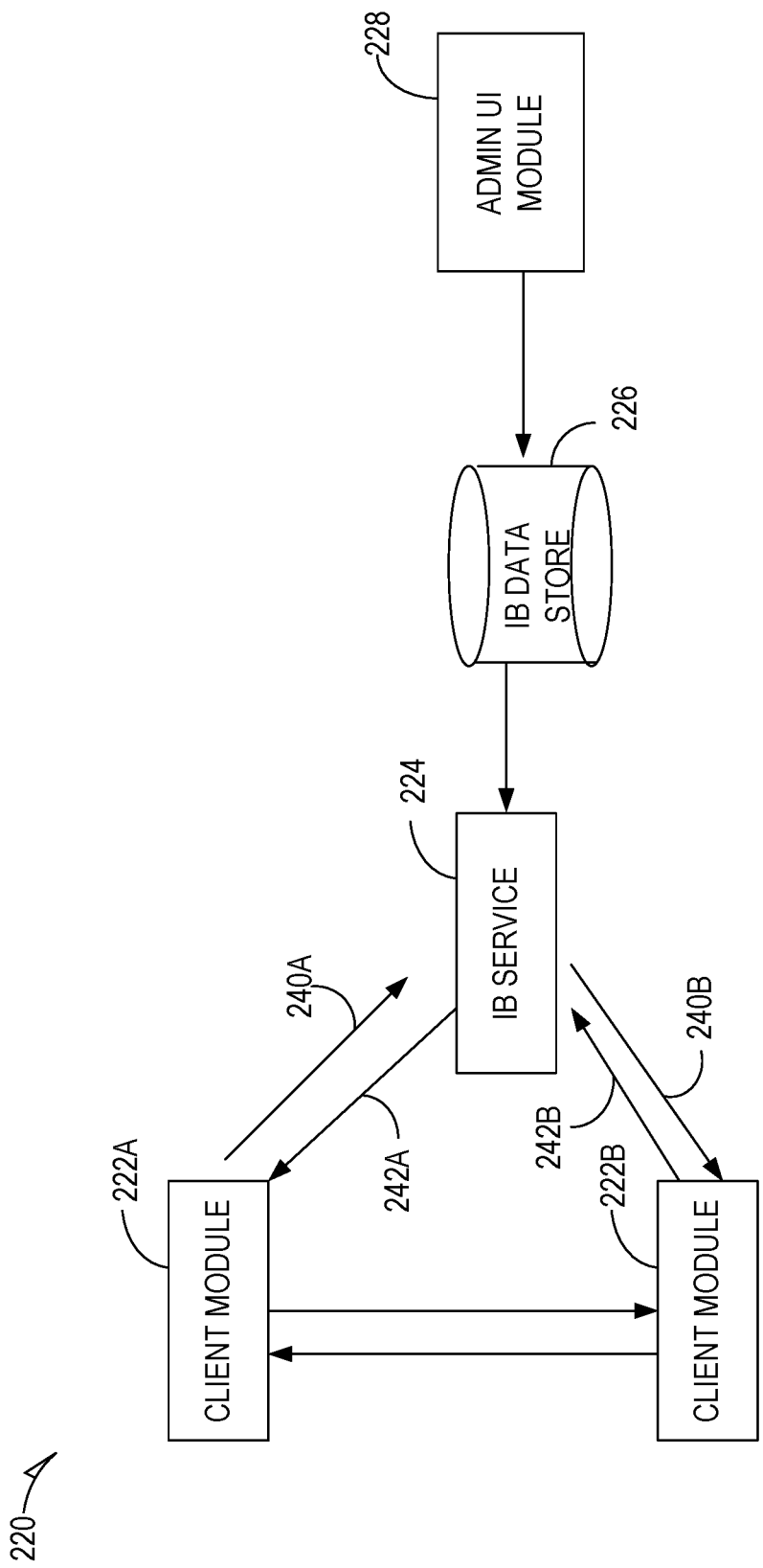
FIG. 2B is a block diagram showing one organization of modules and communication flows that are implemented by one or more of the disclosed embodiments.

FIG. 2B is a block diagram showing one organization 220 of modules and communication flows that are implemented by one or more of the disclosed embodiments. FIG. 2B shows two client modules 222A and 222B. Each of the client modules 222A and 222B are in communication with an IB service 224. The IB service 224 reads data from an IB data store 226. The IB data store 226 stores configuration information defining information barriers enforced by the client modules 222A-B. The configuration information in the IB data store 226 is, in some embodiments, established via an admin UI module 228.

Each of the client modules 222A and 222B provide network application services for a respective first and second computer account. For example, the client modules 222A and/or 222B is, in some embodiments, integrated with an instant messaging application, email application, or other communication application that provides communication services for a computer account. Each of the client modules 222A and/or 222B interface with the IB service 224 to determine which other accounts each of the first account and second account may communicate with. A client module 222A is executing on the user terminal 102A, discussed above with respect to the example information barrier embodiments shown in FIGS. 1D and 1E. The IB service 224 may receive a first request 240A from the client module 222A, and a second request 240B from the client module 222B. Each of the requests identify a respective computer account. Each of the first request 240A and the second request 240B also indicate a request for a list of other accounts with which the respective client module may communicate. The IB service 224 may then consult the IB data store 226 to identify the other accounts, and provide the information to the requesting client module via a message, shown as messages 242A and 242B for the client modules 222A and 222B respectively. In some embodiments, information barrier data is written to the IB data store 226 by an admin UI module 228.

The information received from the IB service 224 is used by each of the client modules 222A and 222B to control communication with other client modules. As shown, each of the client module 222A and 222B may manage communication flows 242A-B based on information received from the IB service 224. For example, if the IB service 224 indicates that an account managed by the client module 222A is able to communicate with a second account managed by client module 222B, then each of the client modules 222A-B may communicate with each other. Otherwise, communication between the two client modules 222A-B is blocked based on the information barrier information received from the IB service 224.

Figure 2C:
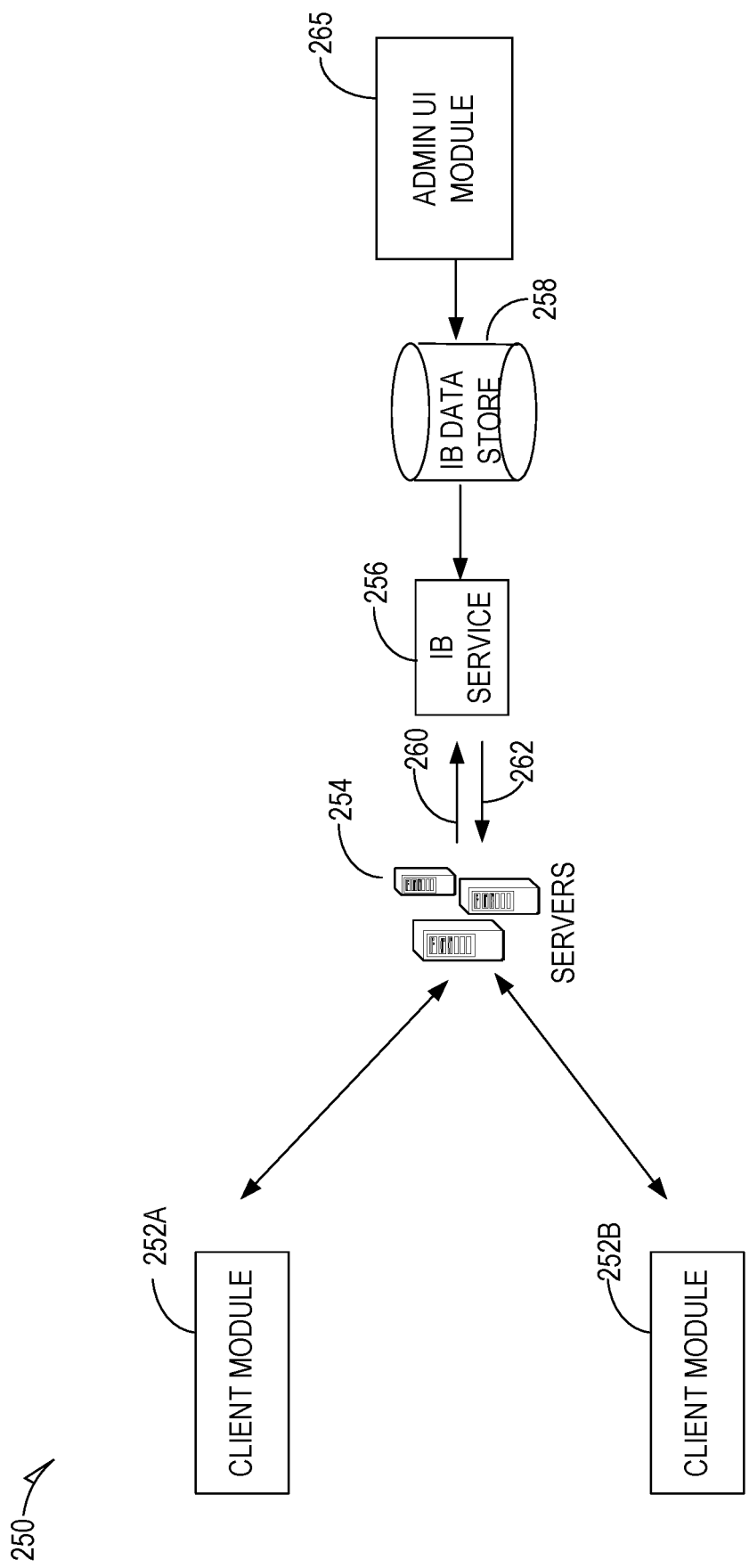
FIG. 2C shows two client modules in communication with a communication server(s).

FIG. 2C shows a view 250 of a client module 252A and a client module 252B in communication with one or more communication server(s) 254. The communication server(s) 254 communicate with an information barrier service 256. Similar to the communication flows discussed above with respect to FIG. 2B, the server(s) 254 request information barrier information for particular accounts from the IB server 256 via request message 260. After consulting the IB Data store 258, the IB server 256 provides information to the server(s) 254 via response message 262 indicating which accounts a particular account may communicate with. The IB data store 258 is, in some embodiments, initialized or populated by an administrative UI module 265.

Figure 3:
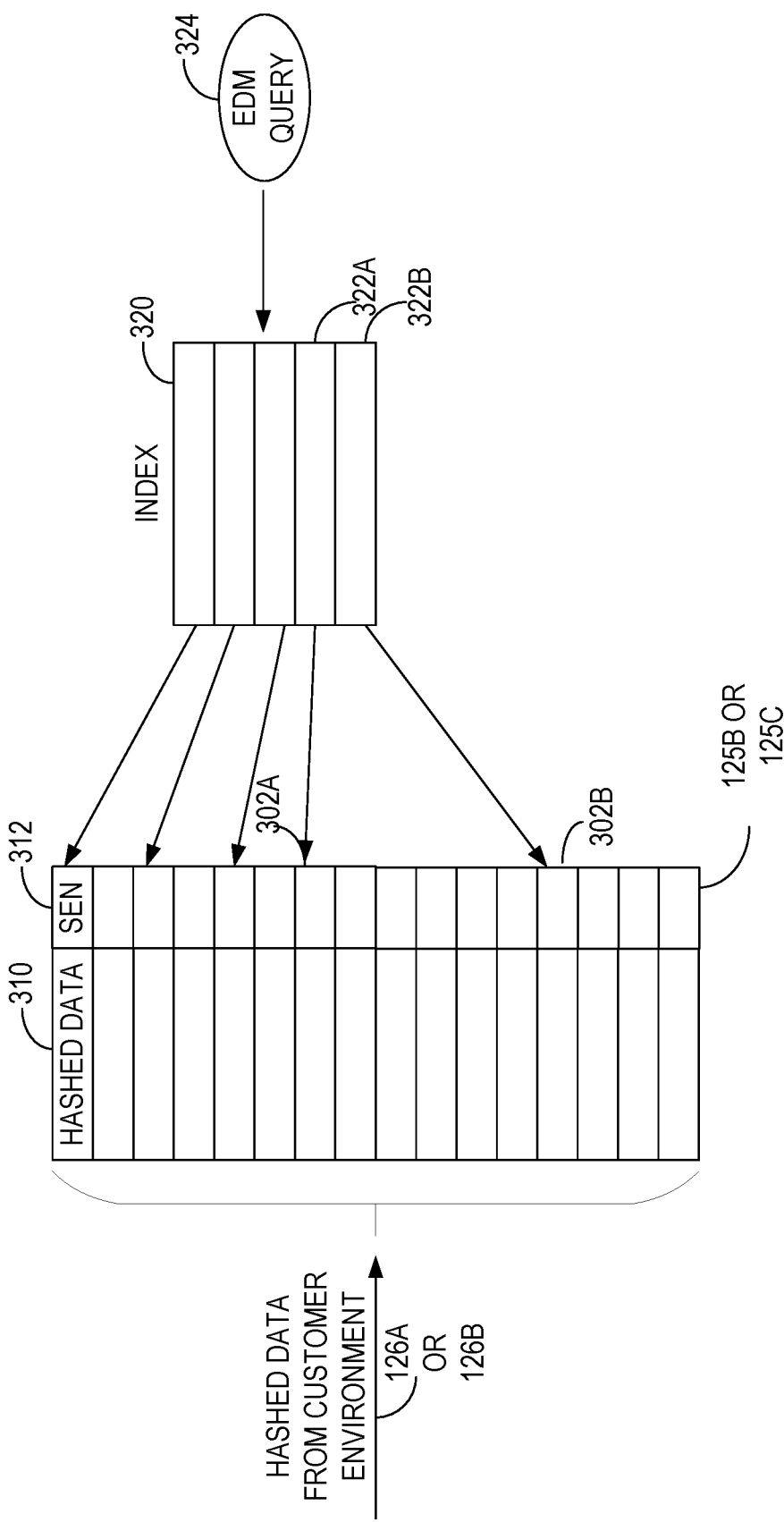
FIG. 3 shows an example of an indexed data store that is implemented in one or more of the disclosed embodiments.

FIG. 3 shows an example of an indexed data store that is implemented in one or more of the disclosed embodiments. As shown in FIG. 3, hashed or encrypted enterprise data is received via data flow 126A or data flow 126B and inserted into the EDM search data store 125A or 125B. The EDM search data store 125A or 125B includes a plurality of data store entries, with two sample entries 302A-B identified to preserve figure clarity. Each of the entry includes hashed data 310 and a sensitivity indicator 312.

FIG. 3 also shows an index 320 that is generated for the EDM search data store 125A or 125B. In some aspects, the index 320 is generated by the DMS module 206, discussed above with respect to FIG. 2A. The index 320 includes entries such as a first entry 322A and a second entry 322B that identify entries 302A and 302B respectively within the EDM search data store 125A or 125B or 125C. An exact data match (EDM) query 324 may consult the index 320 when searching for a portion of network data, such as portion 216 discussed above with respect to FIG. 2A. Note that since, in the illustrated embodiment of FIG. 3, the data included in the EDM search data store 125A or 125B is hashed or encrypted, the EDM query 324 will submit encrypted data, which is indexed by the index 320.

FIG. 4 shows an example user interface that is implemented in one or more of the disclosed embodiments. In some embodiments, the user interface 400 shown in FIG. 4 is implemented by instructions included in the administrative user interface module 208, discussed above with respect to FIG. 2A. The user interface 400 provides for defining of a location to apply a particular policy. For example, the user interface 400 includes selectable control 402A, selectable control 402B, and selectable control 402C that provide for enabling the policy for email, shared websites, and shared storage devices respectively. For each location, the user interface 400 provides for the configuration of groups or users to include in the policy via column 404, and groups or users to exclude from the policy via column 406.

FIG. 5 shows an example user interface that is implemented in one or more of the disclosed embodiments. The user interface 500 is implemented, in some aspects, by instructions included in the administrative user interface module 208, discussed above with respect to FIG. 2A. The user interface 500 provides for configuration of data considered sensitive via the UI section 502. The UI section 502 defines data found sensitive by the DMS 114, discussed above with respect to FIG. 1. As shown in FIG. 5, the user interface 500 displays that an exact match on credit card info, as indicated by 504, will cause a portion of data including the matching credit card information to be considered sensitive. The UI section 502 also provides for configuration of an instance count 506 and a match accuracy 508. Minimum and maximum values for each of the instance count 506 and match accuracy 508 is, in some embodiments, configured via the user interface section 502. The user interface section 502 also provides for configuration via control 510 of specific groups to which the conditions are applied. Additional conditions are included in the policy via control 512.

FIG. 6 shows an example user interface that is implemented in one or more of the disclosed embodiments. The user interface 600 is implemented, in some aspects, by instructions included in the administrative user interface module 208, discussed above with respect to FIG. 2A. The user interface 600 of FIG. 6 provides controls for selection of a mode of policy operation. As shown, the user interface 600 provides for a policy to be turned on immediately via control 602A, in a test mode via control 602B, or to leave the policy turned off via control 602C.

Figure 7:
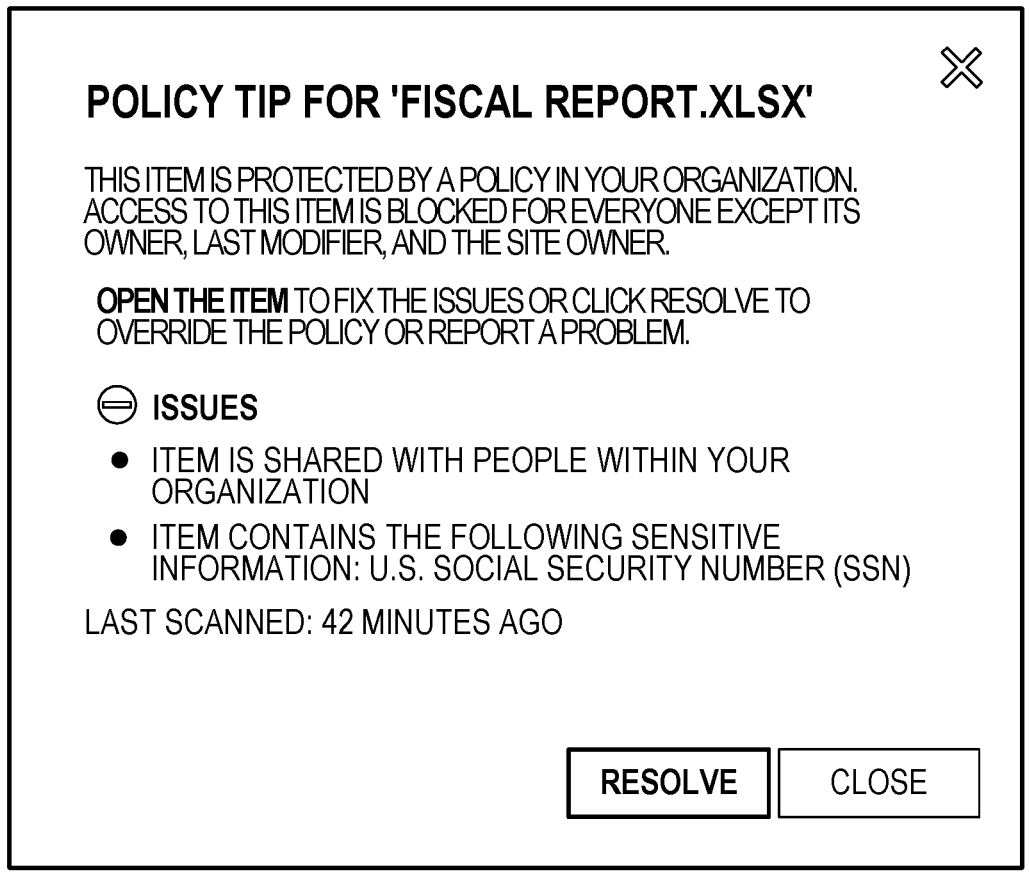
FIG. 7 shows an example user interface that is implemented by one or more of the disclosed embodiments.

FIG. 7 shows an example user interface that is implemented by one or more of the disclosed embodiments. The user interface 700 is implemented, in some aspects, by instructions included in the administrative user interface module 208, discussed above with respect to FIG. 2A. In some aspects, the user interface 700 is displayed on any of the user terminals discussed above with respect to FIGS. 1A-E. In some embodiments, the user interface 700 is displayed when the DMC 108A or 108B determines that the user terminal has attempted to send data deemed sensitive.

Figure 8:
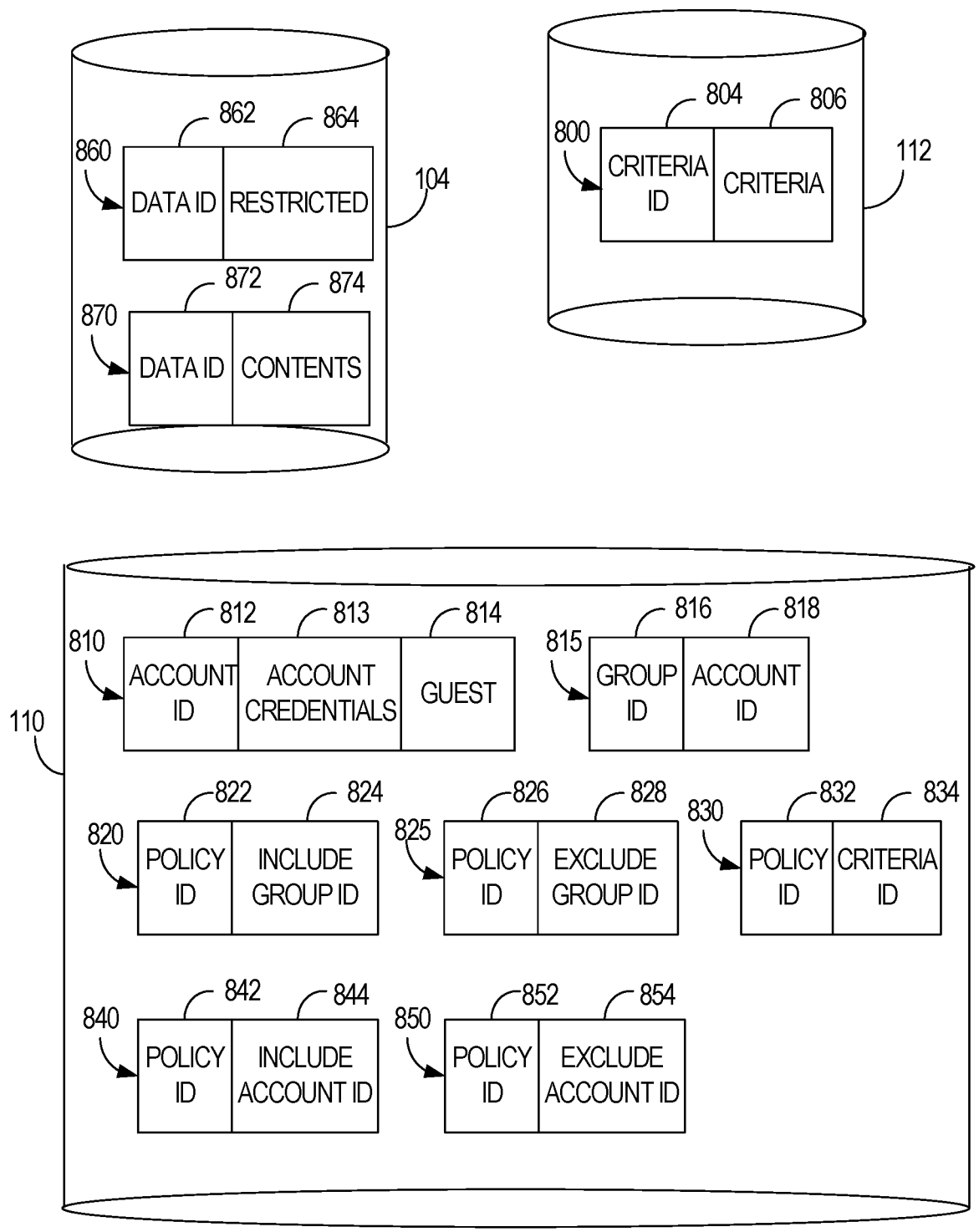
FIG. 8 shows example data structures that is implemented in one or more of the disclosed embodiments.

FIG. 8 shows example data structures that are implemented in one or more of the disclosed embodiments. While the data structures of FIG. 8 are discussed below as relational database tables, one of skill would understand that the fields of the data structures discussed below could be implemented using a variety of data storage techniques, including traditional memory structures such as linked lists, trees, graphs, or arrays, or unstructured data stores in various embodiments. FIG. 8 shows example implementations of a screening data store 112 and policy data store 110 discussed above, for example, with respect to FIG. 1.

The screening data store 112 includes a criteria table 800. The criteria table includes a criteria identifier field 804 and a criteria field 806. The criteria identifier 804 uniquely identifies a particular criteria that is used to identify sensitive data. The criteria identifier 804 is, in some embodiments, cross referenced with other criteria identifiers discussed below with respect to FIG. 8. The criteria field 806 defines the criteria. The criteria stored in field 806 is, in some embodiments, entered via the user interface 500 discussed above. Criteria detecting exact match data 504 is one example of criteria that is, in some embodiments, stored in the criteria table 800. In some aspects, the screening data store 112 is, in some embodiments, configured via the administrative console 113A or administrative console 113B, discussed above with respect to FIGS. 1B and 1C respectively.

The embodiment of the policy data store 110 shown in FIG. 8 includes an account table 810, group table 815, include group table 820, exclude group table 825, policy criteria table 830, include account table 840, and a exclude account table 850. The account table 810 includes an account identifier field 812 and account credentials field 813. The account identifier field 812 uniquely identifies a particular (user) account. The account credentials field 813 defines authentication credentials for the account (such as account name and/or password). The group table 815 includes a group identifier field 816 and an account identifier field 818. The group identifier field 816 uniquely identifies a group of accounts. The account identifier field 818 indicates one account included in the group defined by the group identifier 816. The include group table 820 includes a policy identifier 822 and include group identifier field 824. The policy identifier field 822 uniquely identifies a particular policy, which is, in some embodiments, cross referenced with other policy identifier fields discussed with respect to FIG. 8. The include group identifier field 824 identifies a group to be included within the policy identified by policy identifier field 822. The exclude group table 825 includes a policy identifier 826 and exclude group identifier field 828. The policy identifier field 826 uniquely identifies a particular policy, which is, in some embodiments, cross referenced with other policy identifier fields discussed with respect to FIG. 8. The exclude group identifier field 828 identifies a group to be excluded within the policy identified by policy identifier field 826.

The policy criteria table 830 includes a policy identifier field 832 and criteria identifier field 834. The policy criteria table 830 defines criteria included in a policy (identified via the policy identifier field 832) for determining whether data is sensitive. The include account table 840 defines accounts to which a policy is applied and includes a policy identifier field 842 and include account identifier 844. A policy identified by the policy identifier field 842 is applied to the account identified by the account identifier field 844. The exclude account table 850 includes a policy identifier field 852 and an exclude account identifier field 854. The policy identified by the policy identifier field 852 is not applied to the account identified by the exclude account identifier field 854.

FIG. 8 also shows an embodiment of at least a portion of data store 104A, discussed above with respect to at least FIG. 1B. The embodiment shown in FIG. 8 includes a data table 860, and a data contents table 870. The data table 860 includes a data identifier field 862 and a restricted indication field 864. The data identifier field 862 uniquely identifies particular data within the data store 104A. In some embodiments, the data identifier field 862 may identify a file, a database, a database table, or other data structure. The restricted indication field 864 indicates whether the data identified by the data identifier field 862 is restricted. As discussed above, and with respect to FIG. 11 below, after data is created, it may, in some configurations, be defaulted such that the data is not permitted to be accessed by guest accounts until the data has been uploaded to the EDM search data store 125A or 125B. Once the upload has been completed, the exact data matching methods described herein are able to detect any sensitivity associated with the data, and access to the data may then be provided by, for example, the process 900 discussed below with respect to FIG. 9.

The data contents table 870 includes a data identifier field 872 and contents field 874. The data identifier field 872 may uniquely identify a set of data manipulated and accessed by the disclosed embodiments. The data identifier field 872 may identify, for example, an electronic document, a row in a relational database, or any other set of data managed by the disclosed embodiments. The contents field 874 includes data defining the data itself. Thus, if the data identifier field 872 identifies a spreadsheet file or document, the contents field 874 includes the data of the spreadsheet itself. The contents field 874 may further define meta data associated with the file or document.

Figure 9:
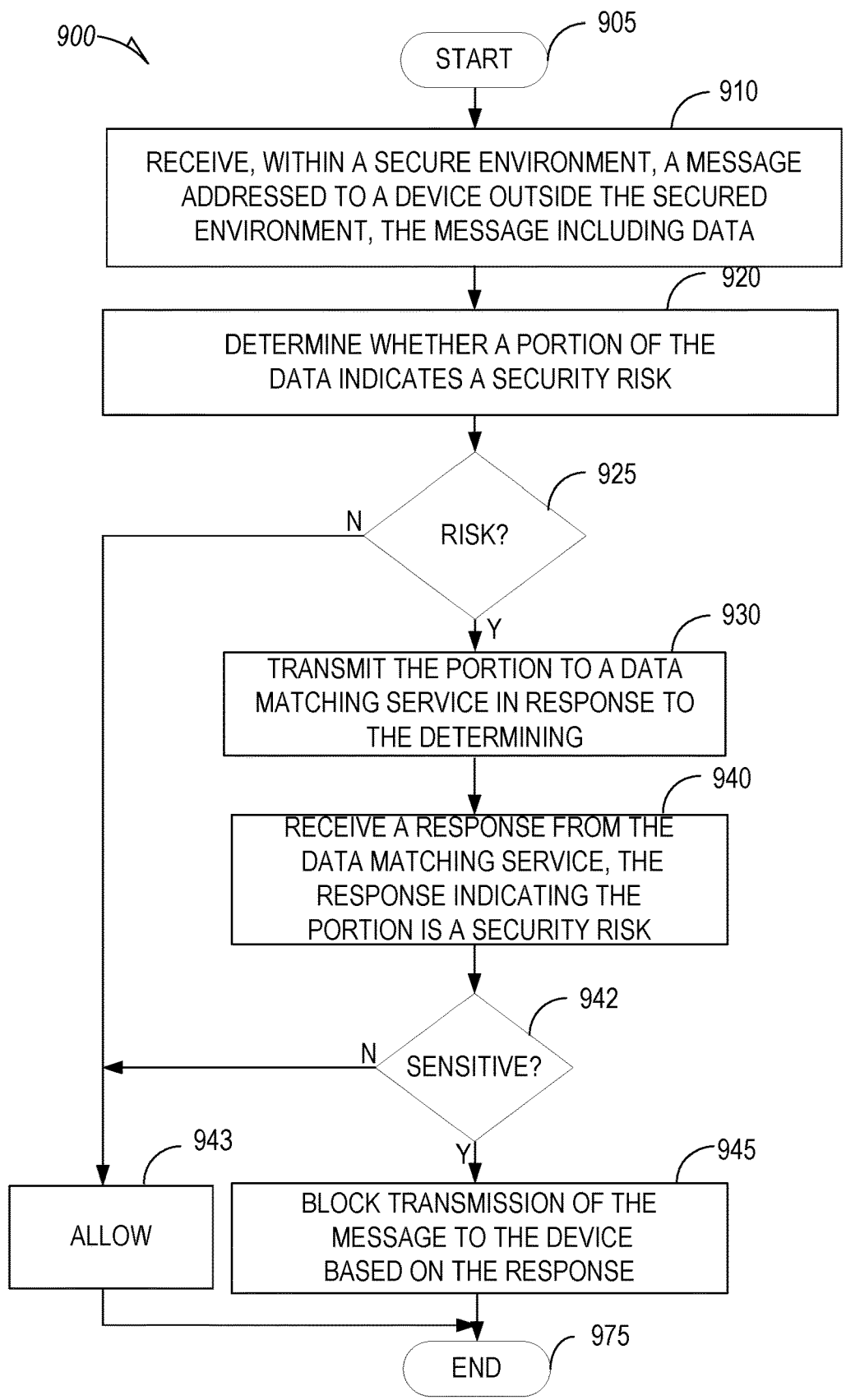
FIG. 9 is a flowchart of an example method for managing sensitive information within an enterprise environment.

FIG. 9 is a flowchart of an example method for managing sensitive information within an enterprise environment. In some aspects, one or more of the functions discussed below are performed by hardware processing circuitry. For example, in some aspects, instructions 2424 in memory 2404 and/or 2406 configure the hardware processor 2402 of FIG. 24 below to perform one or more of the functions discussed below with respect to FIG. 9. In some aspects, one or more of the functions discussed below with respect to FIG. 9 is performed by the DMC module 204, discussed above with respect to FIG. 2A.

After start operation 905, process 900 moves to operation 910. In operation 910, a message is received within a secure environment. In some aspects, the message is received from the user terminal 102A or 102B. In some aspects, the message is received from a network device, such as the application server(s) 116A, a proxy server, network cache, switch, router, or other device. The message is received within a secure environment. For example, in some aspects, the message is received within the enterprise 103A or 103B. In some aspects, the message is received within a "DMZ" (also known as a perimeter network or screened subnet) within network infrastructure of the enterprise 103A or 103B.

The received message is addressed to a device outside the secure environment. For example, the message may include a destination hostname or destination Internet Protocol (IP) address that identifies a device outside the secure environment. For example, the message may identify the external device 117A or 117B, discussed above with respect to FIGS. 1B-C.

The message received in operation 910 includes data. For example, the data is, in some embodiments, included in an electronic document, such as a word processing document, text data, a spreadsheet, a presentation file, data store, or other data.

In operation 920, a determination is made as to whether a portion of the data indicates a security risk. As discussed above with respect to FIG. 1B and FIG. 1C, operation 920 may apply a regular expression or keyword matching process to the data. In some aspects, operation 920 may employ one or more of a Rabin-Karp method, Knuth-Morris-Pratt method, Boyer-Moore string search method, or other method to identify one or more indicators that the portion includes sensitive data. For example, some aspects may attempt to identify personally identifiable information or credit card information in the portion. In some aspects, sensitive data within an enterprise may include some data conforming to particular patterns. As one example, data store records, such as relational data store tables, may have a distinctive signature within an organization.

Functions associated with operation 920 vary based on, for example, screening data store 112 discussed above with respect to FIG. 8, to search for custom data patterns that indicate a risk of sensitive information. These custom patterns are configured, in some embodiments, via a configuration interface presented via the administrative console 113A. Note that operation 920 is performed, in some embodiments, on multiple portions of the data included in the message received in operation 910.

Decision operation 925 evaluates whether operation 920 determined the portion represents a risk of sensitive data. If there is no risk of sensitive data in the portion, process 900 moves from decision operation 925 to the operation 943, where the portion is allowed for transmission. Note that in some cases, the data may include a cohesive set of data, such as data within an electronic document or data store, and the portion may represent less than all of the electronic document or data store. Thus, allowing a portion of the document or data store does not necessarily cause the portion to be transmitted outside the enterprise. Instead, process 900 may determine whether all portions of a cohesive set of data, such as all data included in a particular message, or data included in an electronic document or data store, are allowed or blocked as a whole.

If decision operation 925 determines the portion does present a risk of exposing sensitive data, process 900 moves to operation 930. In operation 930, the portion is transmitted to an (DMS). The transmission of operation 930 is, in some embodiments, a request for the DMS to search a data store (e.g. 125A or 125B) for data matching the portion. The exact data matching service is, in some embodiments, physically located outside the secure environment. Thus, the transmission of the portion exposes the portion, which may include sensitive information. Thus, in some aspects, the portion is encrypted before being transmitted to the EDM service.

In operation 940, a response from the EDM matching service is received. The response indicates whether the portion matched data within the data store (e.g. 125A or 125B). The response may also separately indicate whether the portion includes sensitive data. Thus, while the determination of operation 920 provides an indication of whether the portion indicates a security risk, it does not necessarily definitely determine whether the portion matches known sensitive data within an organization (e.g. enterprise 103A or enterprise 103B), such as data included in an one of the data stores 104A-C.

If decision operation 942 determines the portion matches sensitive data within the EDM search data store 125A or 125B (and/or 104), process 900 moves to operation 945, which blocks transmission of the message to the device based on the response. In some aspects, operation 945 may include sending status information to a firewall, proxy, cache, or other network device integrated with the DMC, indicating the network device should block the message.

If decision operation 942 determines the response indicates either that the portion does not match data in the EDM search data store 125A or 125B (and/or 104) and is not sensitive, then process 900 moves from decision operation 942 to the operation 943, which allows the portion. Processing then moves to end operation 975 from either the operation 943 or the operation 945.

Figure 10:
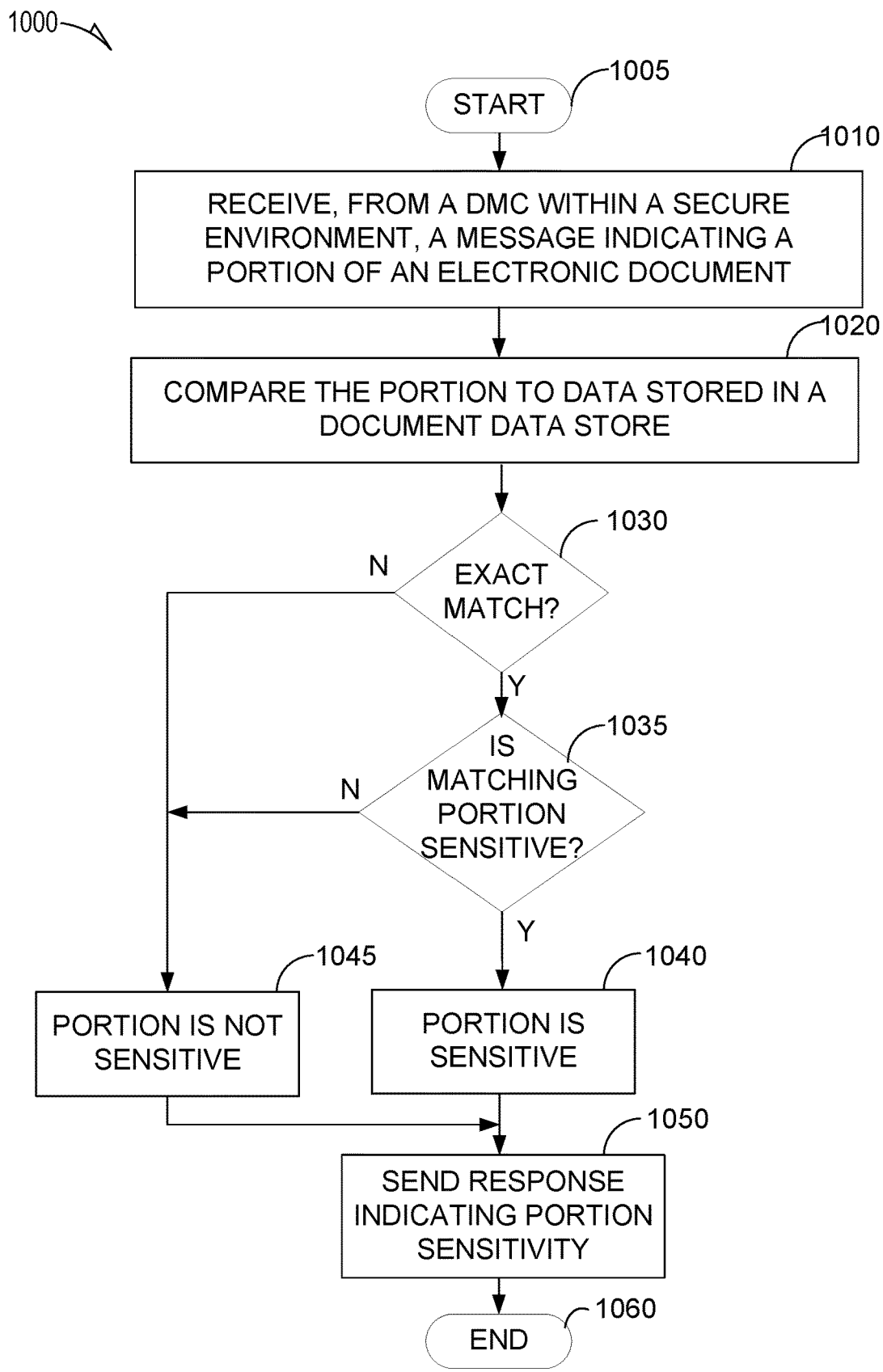
FIG. 10 is a flowchart of an example method for performing an exact data match of a portion of data received from a secured environment.

FIG. 10 is a flowchart of an example method for performing an exact data match of a portion of data received from a secured environment. In some aspects, one or more of the functions discussed below are performed by hardware processing circuitry. For example, in some aspects, instructions 2424 in memory 2404 and/or 2406 configure the hardware processor 2402 to perform one or more of the functions discussed below with respect to FIG. 10. In some aspects, process 1000 discussed below is performed by the DMS module 206, discussed above with respect to FIG. 2A.

After start operation 1005, process 1000 moves to operation 1010. In operation 1010, a message indicating a portion of data, such as an electronic document or data store is received. In some aspects, the message is received from a DMC, such as the DMC 108A or DMC 108B, discussed above with respect to FIGS. 1B and 1C. The message is received indirectly from the DMC in some embodiments, with at least a firewall, cache, proxy, workload, or other network component physically between the DMC and a device performing the process 1000.

In operation 1020, the portion is compared to data stored in a document data store. For example, as discussed above, process 1000 may attempt to identify an exact data match between data of the portion and data stored in a data store, such as the EDM search data store 125A or 125B (and/or 104). As discussed above, the EDM search data store 125A or 125B is synchronized, in some embodiments, with data stored in the secure environment (e.g. synchronize the EDM search data store 125A or 125B with the data store 104A or 104B respectively). In some aspects, the portion is encrypted and/or hashed when received in operation 1010. Thus, the comparison performed in operation 1020 may compare hashed/encrypted portion to similarly hashed/encrypted portions in the EDM search data store (e.g. 125A or 125B). In some aspects, the comparison in operation 1020 may rely on one or more indexes for the data store, such as index 320 discussed above with respect to FIG. 3.

Decision operation 1030 determines whether operation 1020 detected an exact match for the portion. If not, process 1000 moves from decision operation 1030 to operation 1045, which indicates the portion is not sensitive.

If an exact match was found by the operation 1020, process 1000 moves from decision operation 1030 to decision operation 1035, which determines if the matching portion is sensitive. Sensitivity of the portion is indicated, in some embodiments in the EDM search data store 125A or 125B, (e.g. as illustrated by sensitivity indicator 312 of EDM search data store 125A or 125B of FIGS. 1B and 1C respectively). If decision operation determines the matching portion is not sensitive, process 1000 moves from decision operation 1035 to operation 1045. Otherwise, process 1000 moves from decision operation 1035 to operation 1040, which concludes the portion is sensitive. In operation 1050, a response indicating whether the match was found and/or indicating the portion's sensitivity as determined by decision operation 1035 is transmitted. For example, as discussed above with respect to FIG. 2A, the DMS module 206 may send a response 218 indicating a portion's sensitively to the DMC module 204. Process 1000 then moves to end operation 1060.

Figure 11:
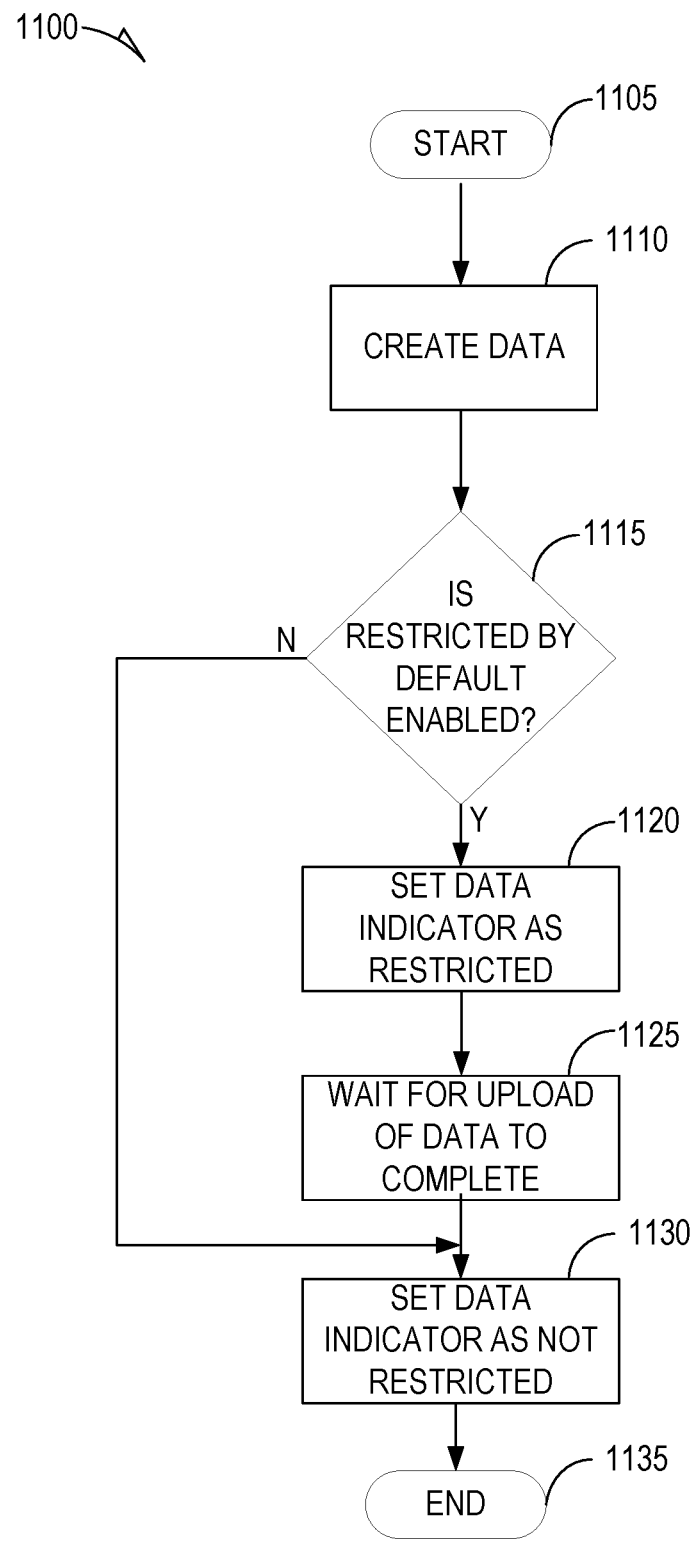
FIG. 11 is a flowchart of an example method for managing restricted access of new data until the new data is uploaded to a data match system.

FIG. 11 is a flowchart of an example method for managing restricted access of new data until the new data is uploaded to a data match system. In some aspects, one or more of the functions discussed below are performed by hardware processing circuitry. For example, in some aspects, instructions 2424 in memory 2404 and/or 2406 configure the hardware processor 2402 to perform one or more of the functions discussed below with respect to FIG. 11. In some aspects, process 1100 discussed below are performed by the DMC module 204, discussed above with respect to FIG. 2A. Process 1100 may operation in conjunction with process 1200, discussed below with respect to FIG. 12. For example, process 1100 describes one embodiment for managing a restricted setting of newly created data. Process 1200 describes one embodiment of providing access to newly created data based on the restricted setting.

After start operation 1105, process 1100 moves to operation 1110 which creates new data. The new data is any of a file, data table, entry in a database, or any other data stored on a non-transient medium. Decision operation 1115 determines if restricting new data is a default setting. In other words, as discussed above, an administrative user interface displayed on the administrative console 113A may provide for configuring any of the network systems 100A-100E for example such that newly created data is initially set as restricted by default. When set as restricted, any of the network systems 100A-E for example will not allow the data to pass outside the enterprise 103A or 103B. If data is restricted by default, process 1100 moves from decision operation 1115 to operation 1120. Otherwise, processing moves to operation 1130 from decision operation 1115.

In operation 1120, a restricted indicator for the data is set to indicate the data is restricted. For example, as discussed above with respect to the data table 860, the data identifier field 862 may identify the newly created data, for example, via data contents table 870, discussed above. Operation 1120 may set the restricted indication field 864 to indicate the file is restricted.

Operation 1125 waits for the upload of the data to complete. For example, as discussed above with respect to FIG. 1B and/or FIG. 1C, new data is added to the new data queue 132A or 132B. While the data is waiting in the new data queue 132A or 132B, it is restricted in some embodiments (e.g. for example, via restricted indication field 864). After the upload from the new data queue (and/or any of the data stores 104A-C) to the EDM search data store 125A or 125B, the DMS will be able to detect matches of the new data if an attempt is made to transmit the new data outside of the enterprise 103A or 103B.

After the upload completes, process 1100 moves from operation 1125 to operation 1130, which sets the indicator (e.g. via restricted indication field 864) to indicate the new data created in operation 1110 is no longer restricted. Process 1100 then moves to end operation 1135.

Figure 12:
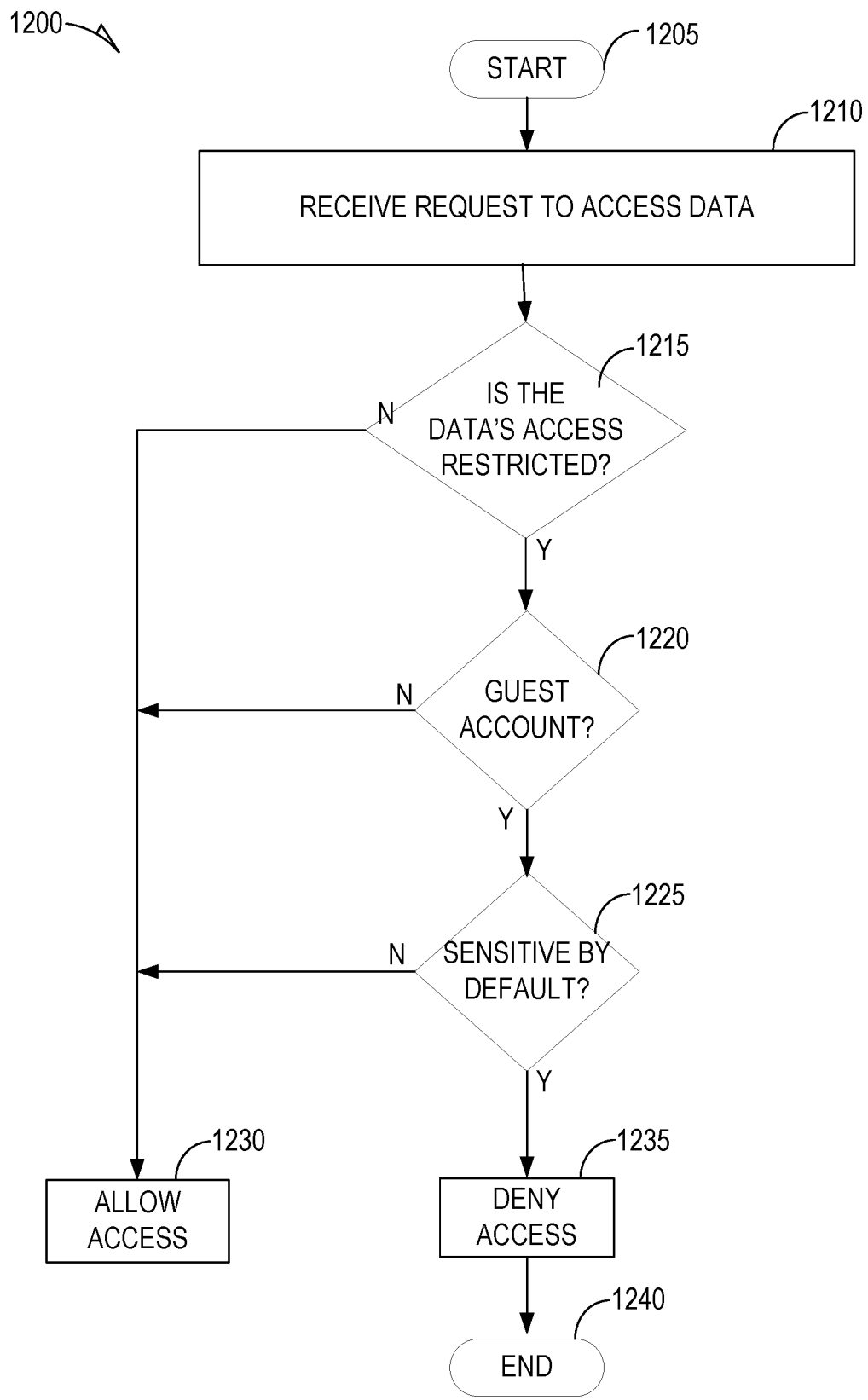
FIG. 12 is a flowchart of an example method for providing access to conditional access to data based on whether access to said data is restricted.

FIG. 12 is a flowchart of an example method for providing access to conditional access to data based on whether access to said data is restricted. In some aspects, one or more of the functions discussed below are performed by hardware processing circuitry. For example, in some aspects, instructions 2424 in memory 2404 and/or 2406 configure the hardware processor 2402 to perform one or more of the functions discussed below with respect to FIG. 12. In some aspects, process 1200 discussed below are performed by the DMC module 204, discussed above with respect to FIG. 2A. Process 1200 may operation in conjunction with process 1100, discussed below with respect to FIG. 11. For example, process 1100 describes one embodiment for managing a restricted setting of newly created data. Process 1200 describes one embodiment of providing access to newly created data based on the restricted setting.

After start operation 1205, process 1200 moves to operation 1210. In operation 1210, a request to access data is received. The request to access data is received, for example, by the DMC 108A or 108B. In other words, a user terminal 102A or 102B may attempt to send data outside the enterprise 103A or 103B, which is intercepted by the DMC 108A or 108B.

Decision operation 1215 determines if access to the data is restricted. In some embodiments, decision operation 1215 may search the data store 104 to identify the data via the data identifier field 862. Decision operation 1215 may then consult the restricted indication field 864 to determine if the data is restricted. If access to the data is not restricted, process 1200 moves from decision operation 1215 to operation 1230, which allows access to the data. Otherwise, process 1200 moves from decision operation 1215 to decision operation 1220 which determines if the access request of operation 1210 is generated by a guest account.

In some aspects, decision operation 1220 consults the guest account indicator 814 discussed above to determine if the request was generated by a guest account. If the request is not generated by a guest account, process 1200 moves from decision operation 1220 to operation 1230. Otherwise, process 1200 moves from decision operation 1220 to decision operation 1225, which determines if data is sensitive by default. If data is not sensitive by default, process 1200 moves to operation 1230, which allows access. Otherwise, process 1200 moves from decision operation 1225 to operation 1235, which denies access to the data. Process 1200 then moves to end operation 1240.

Figure 13A:
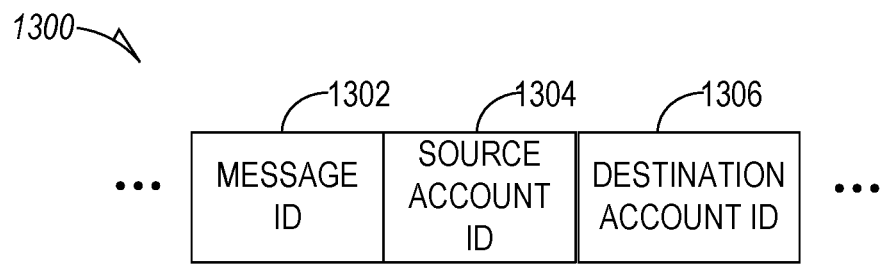
FIG. 13A shows an example message portion that is exchanged between devices implementing one or more of the disclosed embodiments.

FIG. 13A shows an example message portion that is exchanged between devices implementing one or more of the disclosed embodiments. FIG. 13A shows a message portion 1300 that is generated and/or transmitted by the client module 252A and/or the client module 252B of FIG. 2C and/or the IB Service 256 discussed above with respect to FIG. 2C.

FIG. 13A shows the message portion 1300 that includes a message identifier 1302, source account identifier 1304, and destination account identifier 1306. The message identifier 1302 identifies a type of the message portion 1300. The message identifier 1302 may store a value indicating a type or format of the message portion 1300. For example, the value stored in the message identifier 1302 may indicate a presence and size of the source account id field 1304 and/or destination account identifier field 1306. The message portion 1300 indicates a request to determine whether a first account identified by the source account id field 1304 may communicate, based on information barrier(s), with a second account identified by the destination account identifier field 1306.

The source account identifier field 1304 identifies the first account and the destination account identifier field 1306 identifies the second account.

Figure 13B:
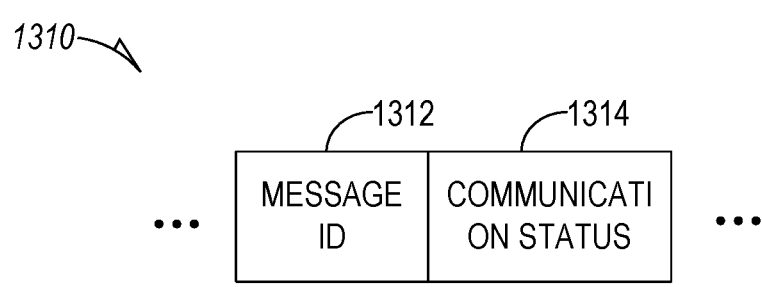
FIG. 13B is an example of a message portion that is implemented by some of the disclosed embodiments.

FIG. 13B is an example of a message portion that is implemented by some of the disclosed embodiments. In some aspects, the message portion 1310 discussed below with respect to FIG. 13B is generated and/or transmitted by the IB service 224 and/or IB service 256, discussed above with respect to FIGS. 2B and 2C respectively.

The message portion 1310 includes a message id field 1312, and a communication status field 1314. The message portion 1310 is transmitted, in some embodiments, in response to reception of the message portion 1300. In some aspects, the message identifier field 1312 stores a value indicating a type or format of the message portion 1310, and that the message portion 1310 is a response to the message portion 1300. The communication status field 1314 indicates a communication status between the first account identified by the source account identifier field 1304 and the second account identified by the destination account identifier field 1306. For example, if the first account is allowed to communicate with the second account, the communication status field 1314 stores a first predetermined value while if the first account is not allowed to communicate with the second account, the communication status field 1314 stores a second predetermined value.

Figure 14A:
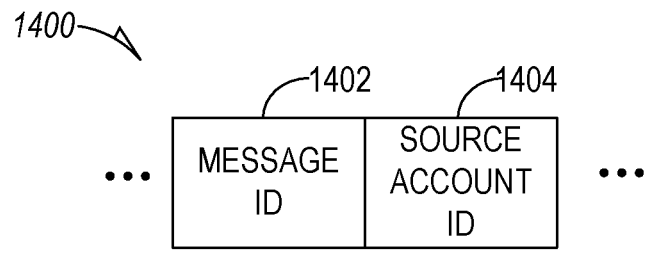
FIG. 14A shows an example message portion that is implemented by one or more of the disclosed embodiments.

FIG. 14A shows an example message portion that is implemented by one or more of the disclosed embodiments. In some aspects, the message portion 1400 discussed below with respect to FIG. 14A is generated and/or transmitted by the client module 222A and/or 222B discussed above with respect to FIG. 2B, and/or the communication server(s) 254, discussed above with respect to FIG. 2C.

The message portion 1400 includes a message identifier 1402 and a source account identifier field 1404. The message identifier 1402 carries a value that indicates a format or type of the message portion 1400. For example, the value of the message identifier 1402 may indicate a presence and size of the message portion 1400, the message id field 1402 and/or the source account identifier field 1404. The message portion 1400 indicates a request to identify accounts with which the account identified by the source account identifier field 1404 may communicate. In other words, a device may need to acquire a list of accounts with which the first account may communicate. This list is used, in some embodiments, to display the list of accounts in a user interface, such that one or more of the accounts is selected as a destination for a message. The list is requested, in some embodiments, via the message portion 1400.

Figure 14B:
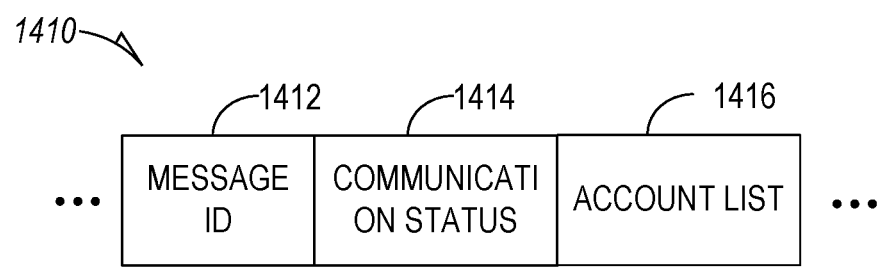
FIG. 14B is an example message portion that is implemented in one or more of the disclosed embodiments.

FIG. 14B is an example message portion that is implemented in one or more of the disclosed embodiments. In some aspects, the message portion 1410 is generated and transmitted by the IB service 224 and/or IB service 256, discussed above with respect to FIGS. 2B and 2C respectively.

FIG. 14B shows a message portion 1410 that includes a message identifier field 1412, a communication status field 1414, and an account list 1416. The message portion 1400 is sent, in some embodiments, in response to the message portion 1400, discussed above with respect to FIG. 14A. The message identifier 1412 identifies a type or format of the message portion 1410. The message identifier 1412 is set to a predetermined value identifying the message portion 1410. The communication status field 1414 indicates a status of a response to the message portion 1400. For example, the communication status field 1414 may indicate, via a first predetermined value, that the account identified by the source account identifier field 1404 was a valid account while a second predetermined value indicates the source account identifier field 1404 indicated an invalid account identifier. The account list 1416 identifies zero or more accounts with which the account identified by the source account identifier field 1404.

Figure 15:
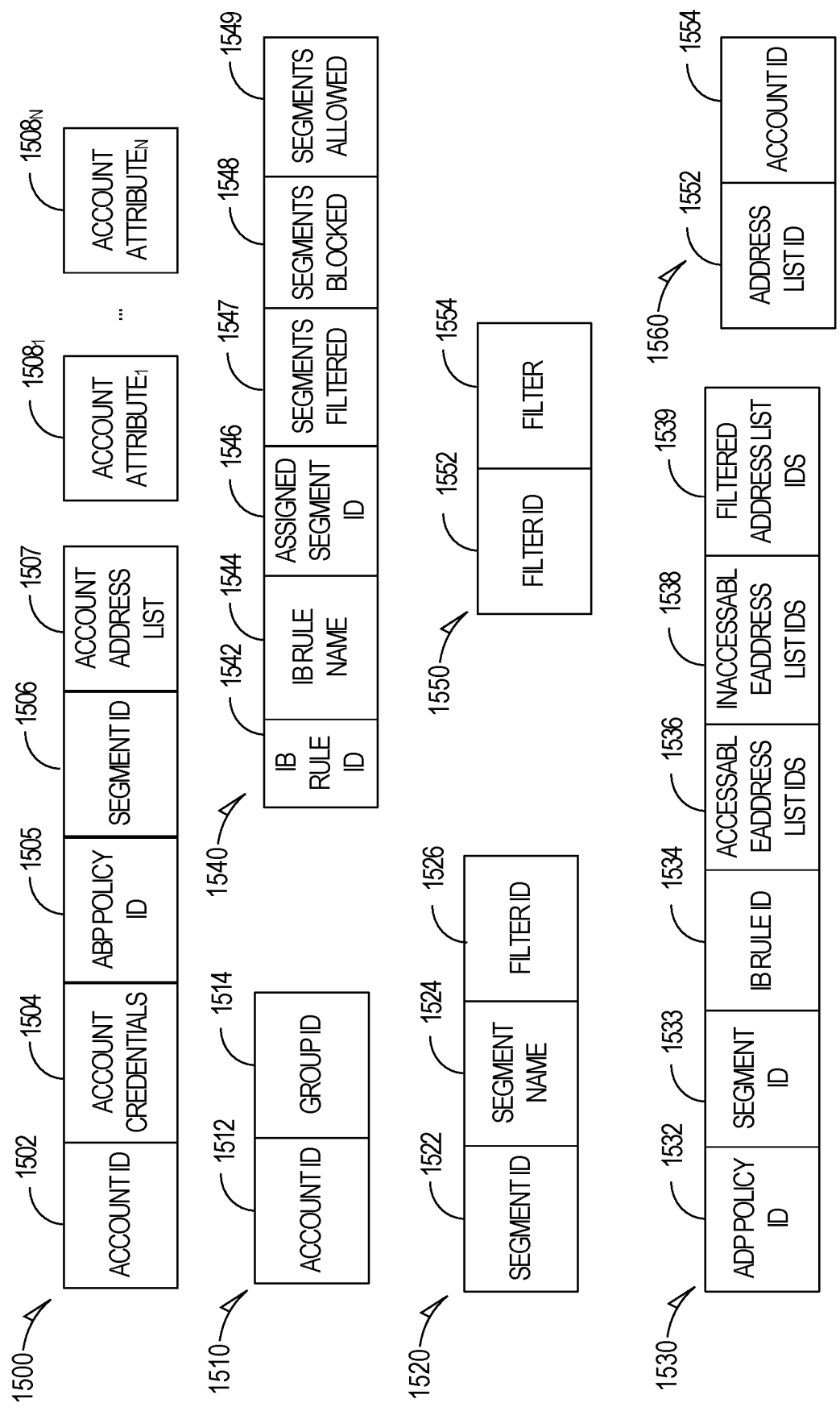
FIG. 15 shows example data structures that is implemented in one or more of the disclosed embodiments

FIG. 15 shows example data structures that are implemented in one or more of the disclosed embodiments. While the data structures discussed below with respect to FIG. 15 are described as relational database tables, one of skill would understand that the described data could be represented using a variety of data structures, including non-structured data stores, traditional memory structures such as linked lists, arrays, queues, trees, or other representations. The data structures discussed below are included, in some embodiments, in the IB data store 226 or the IB data store 258, discussed above with respect to FIGS. 3 and 4 respectively.

FIG. 15 shows an account table 1500, a group table 1510, a segment table 1520, an address book policy table 1530, and an information barrier rule table 1540, and a filter table 1550. The account table 1500 includes an account identifier field 1502, account credentials field 1504, an address book policy identifier field 1505, a segment identifier field 1506, an account address list field 1507, and one or more account attribute fields $1508_1 \ldots _n$. In some aspects, the account table 1500 and/or group table 1510 are included in an electronic organizational directory, such as those implementing directory services. The directory services are provided, in various embodiments, via lightweight directory access protocol (LDAP) and/or Microsoft Active Directory™ technology.

The account identifier field 1502 uniquely identifies an account. The account identifier field 1502 is cross referenced, in some embodiments, with other account identifier fields discussed below with respect to FIG. 15 and/or other account identifier fields discussed above with respect to FIGS. 13A-14B. The account credentials field 1504 may store one or more credentials for the account identified by the account identifier field 1502. This may include, for example, an account name and/or password for the account. The address book policy identifier field 1505 identifies an address book policy to apply to the account identified by the account identifier 1502. In some embodiments, the address book policy is a Microsoft Active Directory address book policy. The address book policy is described below. The segment identifier field 1506 identifies a segment that the account is included in. Segments are described further below. The account address list field 1507 identifies an address list that the account identified by the account identifier 1502 is part of For example, if the account is part of an "engineering" address list, the "engineering" address list is identified by the field 1507.

The account attributes $1508_1 \ldots _n$ store values for one or more attributes for the account. The attributes may include, for example, a title of an individual assigned to the account, a creation date of the account, a home geographical location for an individual of the account, or other attributes.

The group table 1510 includes an account identifier field 1512 and group identifier field 1514. The account identifier field 1512 identifies an account while the group identifier field 1514 identifies a group of which the account (e.g. 1512) is a member. A group including multiple accounts may appear in multiple rows of the group table 1510.

The segment table 1520 includes a segment identifier 1522, segment name 1524, and filter identifier 1526. The segment identifier 1522 uniquely identifies a segment. The segment name 1524 defines a name for the segment. The segment name is, in some embodiments, used to reference the segment in a user interface for example. The filter id 1526 identifies a filter for the segment. The filter identifies accounts included in or excluded from the segment (e.g. 1522).

The address book policy table 1530 includes an address book policy identifier field 1532, a segment identifier 1533, an information barrier rule identifier field 1534, an accessible address list identifiers field 1536, an inaccessible address list identifiers field 1538, and a filtered address list identifiers field 1539. The address book policy identifier field 1532 uniquely identifies an address book policy and is cross referenced, in some embodiments, with the address book policy identifier field 1505. Segment identifier 1533 identifies a segment (e.g. 1520) associated with the particular address book policy identified via 1532. The IB rule identifier field 1534 identifies an IB rule to apply. The IB rule is defined in the information barrier rule table 1540, discussed below. The accessible address list identifiers field 1536 identifies an access list of zero or more address lists identifying accounts that can be communicated with. The inaccessible address list identifiers field 1538 identifies a negative access list that identifies accounts with which communication is not permitted under the ADP policy. The filtered address list identifiers field 1539 is a filtered access list that identifies address lists that identify accounts with which communication is filtered by the ADP policy. For example, messages to accounts on the filtered address list are examined, in some embodiments, to determine if the messages include sensitive information. In some embodiments, if sensitive information is present in the message, the message is blocked by the policy, otherwise they are allowed.

The information barrier (IB) rule table 1540 includes an IB rule identifier 1542, IB rule name field 1544, assigned segment identifier field 1546, a segments filtered field 1547, a segments blocked field 1548 and a segments allowed field 1549. The IB rule identifier field 1542 uniquely identifies a segment, and is cross referenced with, in some embodiments, the segment identifier field 1522. The IB rule name field 1544 defines a name for the IB rule identified by policy identifier 1542. The IB rule name field 1544 may store a name used to refer to the IB rule in one or more user interfaces implemented by one or more of the disclosed embodiments. The assigned segment identifier field 1546 identifies a segment to which the IB rule (identified by IB rule id 1542) is applied. The segments filtered field 1547 identifies zero or more segments (e.g. via zero or more segment identifiers that are cross referenced with the segment identifier 1522) that have their messages filtered before determining whether to allow communication with the identified segment (identified by the assigned segment identifier field 1546).

The segments blocked field 1548 identifies zero or more segments (e.g. via zero or more segment identifiers that are cross referenced with the segment identifier 1522) that are prevented from communicated with the segment identified by the assigned segment identifier field 1546. The segments allowed field 1549 identifies zero or more segments (via zero or more segment identifiers that are cross referenced with the segment identifier 1522) that define accounts prevented from communication with accounts defined by the assigned segment identifier field 1546. Note that there can be devices that are identified by both the segments blocked field 1548 and the segments allowed field 1549.

The filter table 1550 includes a filter identifier field 1552 and a filter field 1554. The filter identifier field 1552 uniquely identifies a filter and is cross referenced with the filter identifier field 1526 discussed above in some embodiments. The filter field 1554 stores a filter. For example, the filter field 1554 may store a query that identifies one or more accounts of the account table 1500.

The address list table 1560 includes an address list identifier 1562 and an account identifier 1564. The address list identifier 1562 uniquely identifies an address list. The account identifier 1554 identifies an account included in the address list.

Figure 16:
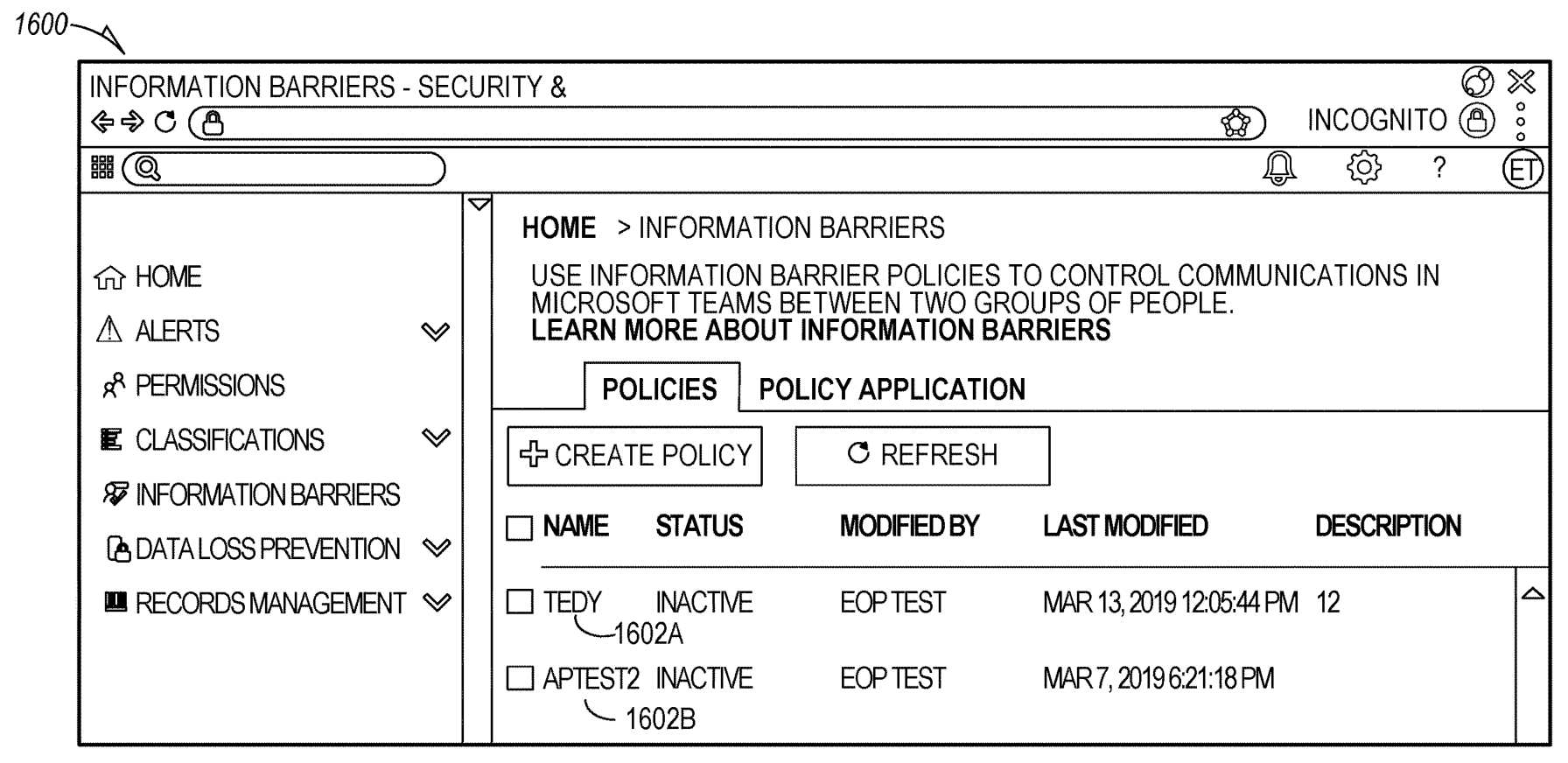

FIG. 16 shows an example user interface that is implemented in one or more of the disclosed embodiments. The example user interface 1600 of FIG. 16 is configured to list information barrier policies for a given tenant or account. The example shown in FIG. 16 shows two IB policies as 1602A and 1602B.

Figure 17:
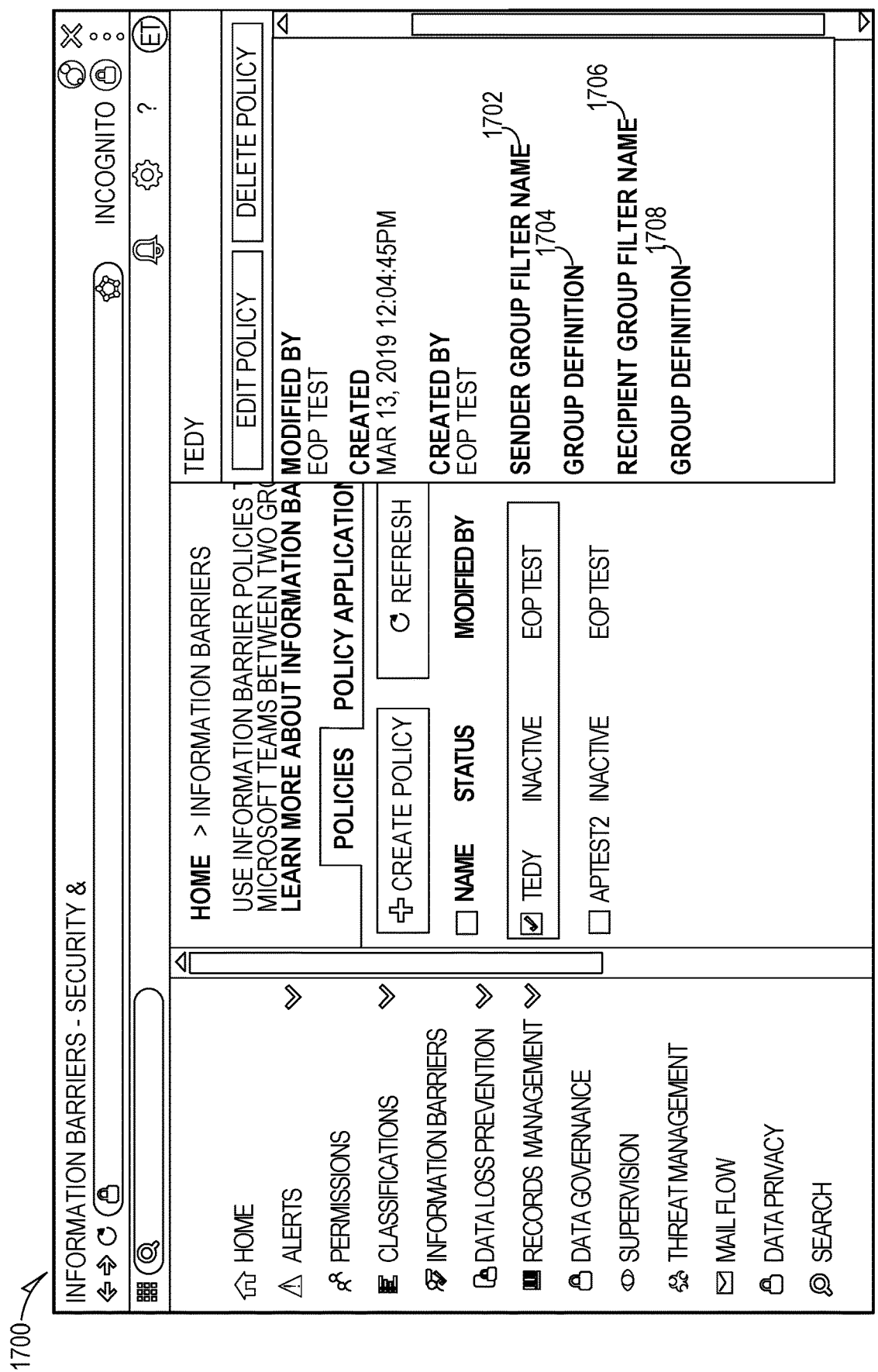
FIG. 17 shows an example user interface that is implemented in one or more of the disclosed embodiments.

FIG. 17 shows an example user interface that is implemented in one or more of the disclosed embodiments. The example user interface 1700 of FIG. 17 is configured to receive input that defines an IB policy. The example user interface 1700 displays a sender group filter name 1702, group definition field 1704, recipient group filter name 1706, and a group definition 1708.

FIG. 18 shows an example user interface that is implemented in one or more of the disclosed embodiments. The user interface 1800 of FIG. 18 is configured to display a history of tenant wide application of configured policies. Two example log records of policy application are shown as 1802A and 1802B.

Some embodiments may provide command line interfaces that operate to initialize or set values in the data structures described above. For example, an example command line based user interface to create organization segments is illustrated below:

New-OrganizationSegment -Name "Sales" -UserGroupFilter "Department -eq 'Sales'"
New-OrganizationSegment -Name "Research" -UserGroupFilter "Department -eq 'Research'"
New-OrganizationSegment -Name "Engineering" -UserGroupFilter "Department -eq 'Engineering'"

Figure 19:
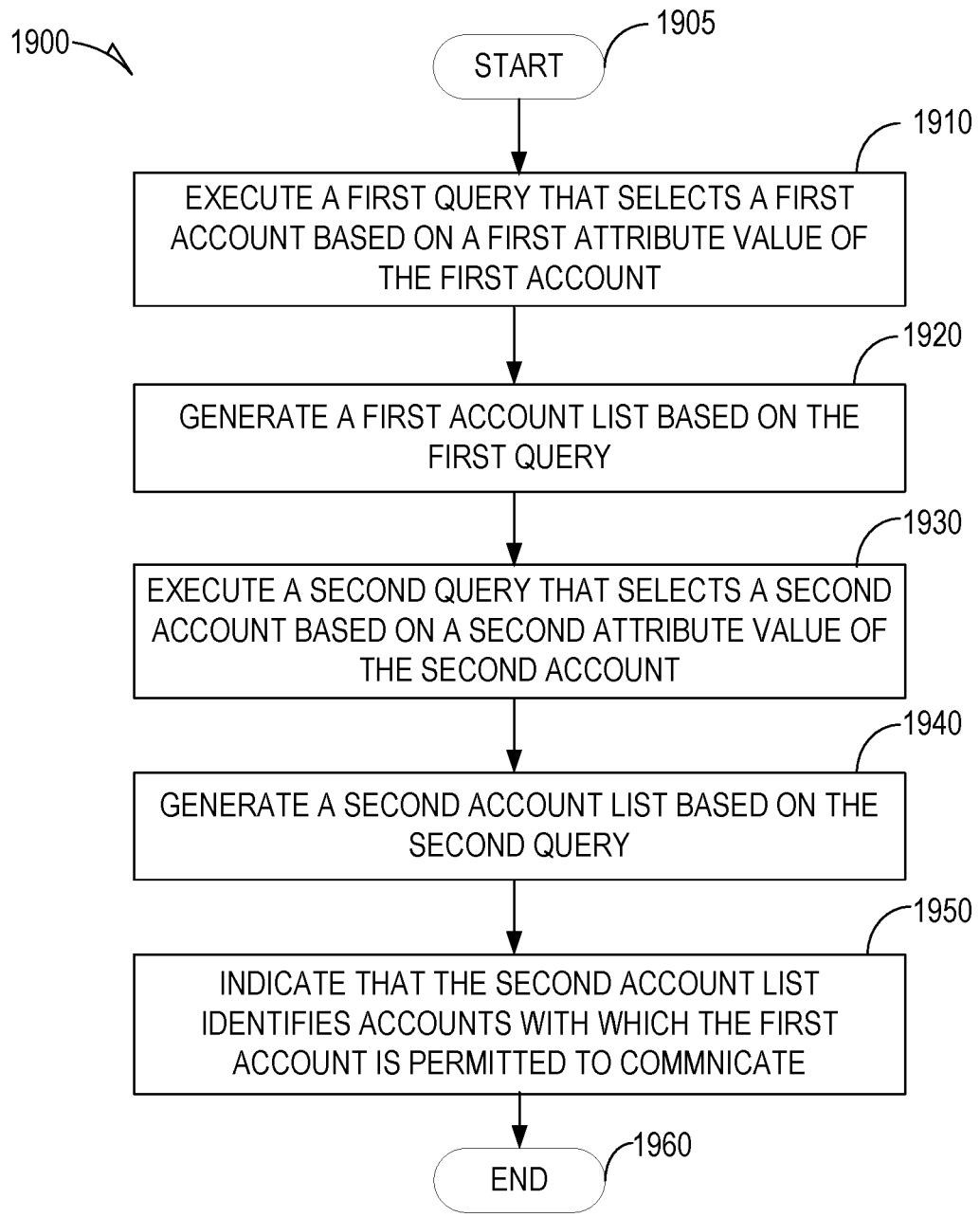
FIG. 19 is a flowchart of a method of generating data structures to support an information barrier (IB).

Example creation of an information barrier policy that blocks communication from "sales" to "research" is shown below:

New-InformationBarrierPolicy -Name "Sales-Research" -AssignedSegment "Sales" -SegmentsBlocked "Research" -State Active Example creation of an information barrier policy that blocks communication from "research" to "sales" is shown below:

New-InformationBarrierPolicy -Name "Research-Sales" -AssignedSegment "Research" -SegmentsBlocked "Sales" -State Active Another example creation of an information barrier policy that allows the research department to communicate only with engineering. Note that this policy does not impose any restriction on engineering:

New-InformationBarrierPolicy -Name "Research-Engineering" -AssignedSegment "Research" -SegmentsAllowed "Engineering" -State Active FIG. 19 is a flowchart of a method of generating data structures to support an information barrier. In some aspects, one or more of the functions discussed below with respect to FIG. 19 and the process 1900 is performed by hardware processing circuitry. For example, the instructions 2424 discussed below in the memory 2404 and/or 2406 may configure the processor 2402 to perform one or more of the functions discussed below. In some aspects, the process 1900 discussed below is performed by the IB service 224 or IB service 256 discussed above with respect to FIGS. 2B and 2C respectively. In some aspects, process 1900 is performed by any of the client modules 222A-B, discussed above with respect to FIG. 2B. In some aspects, the process 1900 is performed by the communication server(s) 254, discussed above with respect to FIG. 2C.

As described above, the disclosed embodiments may generate data structures used to provide for efficient identification of information barriers between two accounts. By preestablishing account lists defining which accounts may and may not communicate with each other, run time performance is improved at some expense of configuration. Configuration is performed infrequently while application of information barrier polices is performed with most communications and thus it can be more important to provide for efficient run time execution.

After start block 1905, process 1900 moves to operation 1910. In operation 1910, a first query is executed that selects a first account based on a first attribute value of the first account. For example, as discussed above, segments are defined, in some embodiments, by queries that select accounts having one or more particular attribute values (e.g. $1508_{1 \ldots n}$).

In operation 1920, a first account list is generated based on the first query. As an example discussed above, a segment is, in some embodiments, defined based on a query. Executing the query identifies accounts that are included in the segment. As discussed above with respect to FIG. 15, a particular segment (e.g. 1522) is defined based on a query or filter (e.g. 1526). Executing or running the query identifies accounts included in the segment. In the examples above, executing the usergroupfilter "Department-eq 'sales'" may query values for a "department" attribute (e.g. $1508_{1 \ldots n}$). Operation 1920 generates an account list including accounts identified by the query.

In operation 1930, a second query is executed that selects a second account based on second attribute values of the second account. Continuing with the examples above, New-OrganizationSegment-Name "Research" -UserGroupFilter "Department-eq 'Research'" defines a second query of accounts having a department attribute value equal to "Research." In contrast, New-InformationBarrierPolicy-Name "Research-Engineering"-

In operation 1940, a second account list is generated based on results of the second query. The second account list includes accounts identified from the second query.

In operation 1950, an indication is generated that the second account list identifies accounts with which the first account is permitted to communicate. For example, as discussed above, information barrier policies can be defined. Continuing with the example above "New-InformationBarrierPolicy -Name "Sales-Research" -AssignedSegment "Sales" -SegmentsBlocked "Research" "indicates that communication from accounts included in the "sales" segment to accounts included in the "Research" segment are blocked. AssignedSegment "Research" -SegmentsAllowed "Engineering" establishes that communication from accounts included in a "research" segment to accounts included in "engineering" is allowed. As discussed above with respect to FIG. 15, in one example embodiment, account lists indicating included and/or excluded accounts (e.g. 1536 and/or 1538) are provided in an address book policy (e.g. 1532). After operation 1950 completes, process 1900 moves to end operation 1960.

Figure 20:
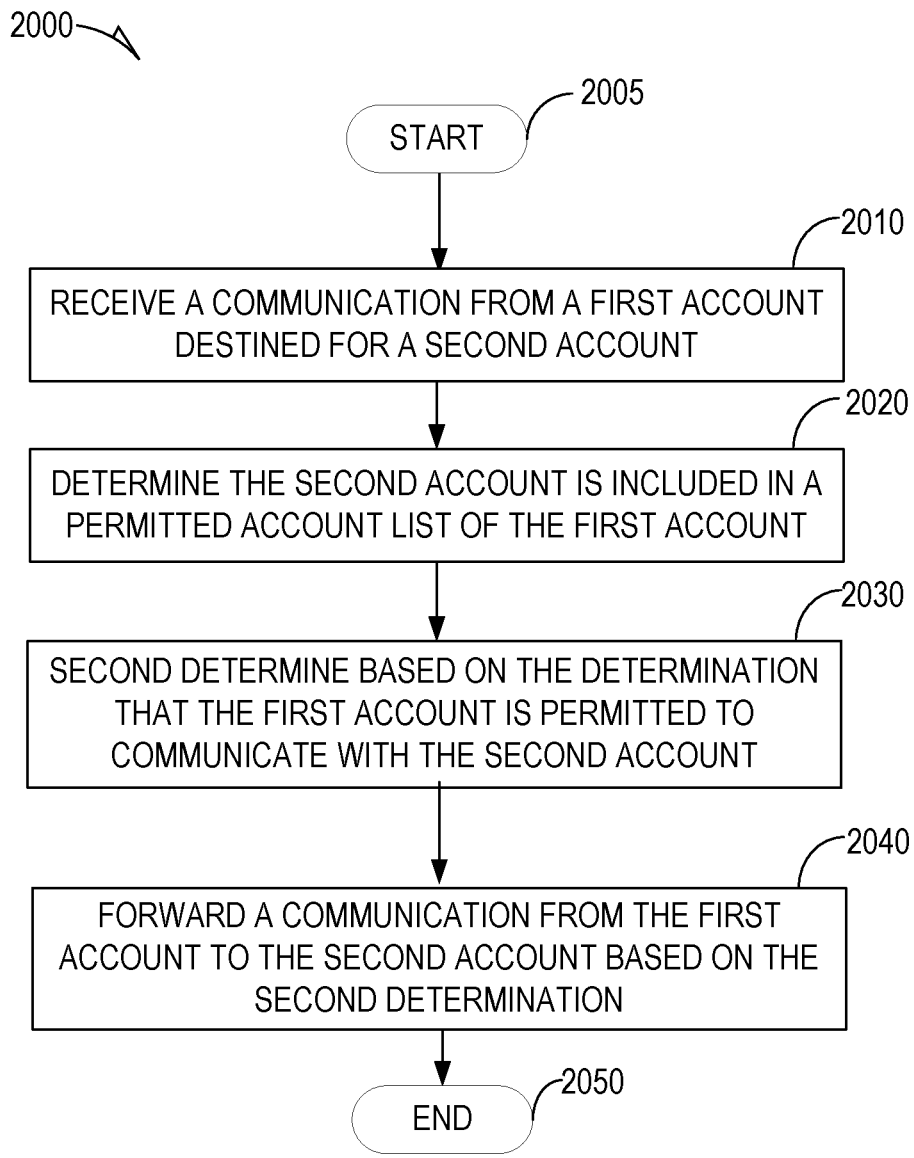
FIG. 20 is a flowchart of a method of enforcing an IB.

FIG. 20 is a flowchart of a method of enforcing an information barrier. In some aspects, one or more of the functions discussed below with respect to FIG. 20 and the process 2000 is performed by hardware processing circuitry. For example, the instructions 2424 discussed below in the memory 2404 and/or 2406 may configure the processor 2402 to perform one or more of the functions discussed below. In some aspects, the process 2000 discussed below is performed by the IB service 224 or IB service 256 discussed above with respect to FIGS. 2B and 2C respectively. In some aspects, process 2000 is performed by any of the client modules 222A-B, discussed above with respect to FIG. 2B. In some aspects, the process 2000 is performed by the communication server(s) 254, discussed above with respect to FIG. 2C.

After start operation 2005, process 2000 moves to operation 2010, which receives a communication from a first account destined for a second account. In operation 2020, a determination is made that the second account is included in a permitted account list of the first account. For example, as discussed above, one or more account lists are, in some embodiments, associated with an account. As illustrated in FIG. 15, this association is via an address book policy in some aspects (e.g. via 1536 and/or 1538), but is not necessary the case. The permitted account list is generated, in some aspects, via process 1900 discussed above.

In operation 2030, a determination is made that since the second account is included in the permitted account list, the first account may communicate with the second account.

In operation 2040, the communication from the first account is forwarded to the second account based on the determination of operation 2030. After operation 2040 completes, process 2000 moves to end operation 2050.

Figure 21:
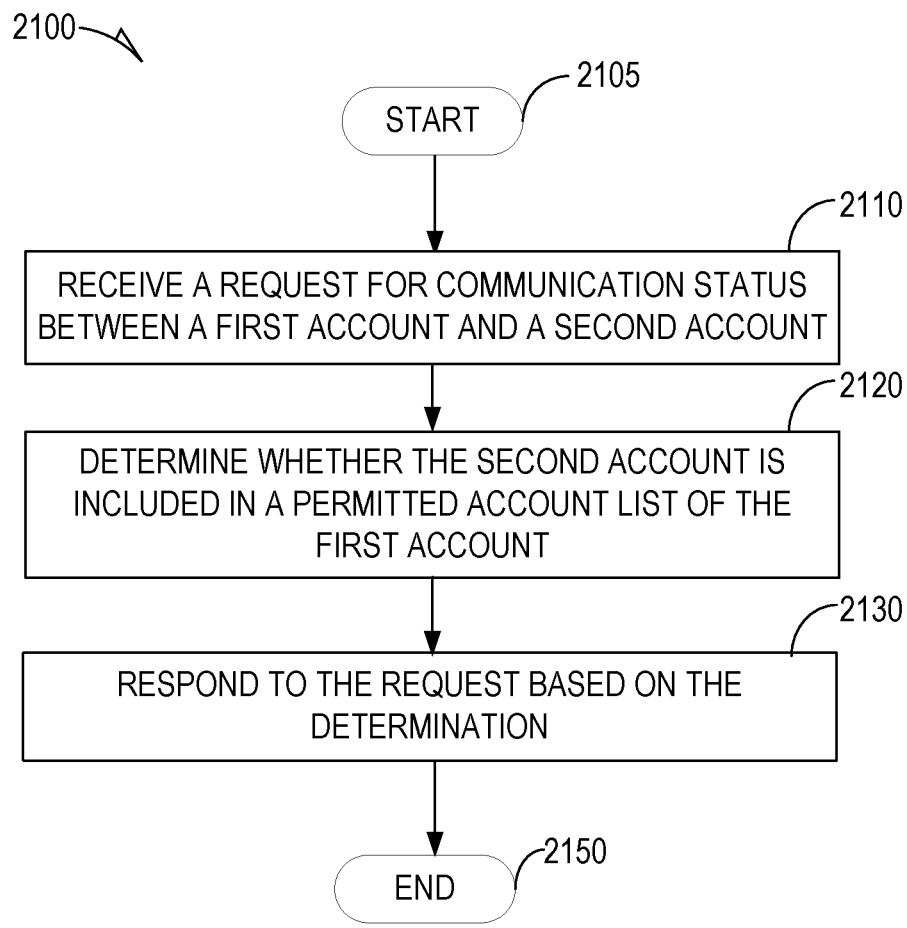
FIG. 21 is a flowchart of a method of responding to a query for IB information

FIG. 21 is a flowchart of a method of responding to a query for information barrier information. In some aspects, one or more of the functions discussed below with respect to FIG. 21 and the process 2100 is performed by hardware processing circuitry. For example, the instructions 2424 discussed below in the memory 2404 and/or 2406 may configure the processor 2402 to perform one or more of the functions discussed below. In some aspects, the process 2100 discussed below is performed by the IB service 224 or IB service 256 discussed above with respect to FIGS. 2B and 2C respectively. In some aspects, process 2100 is performed by any of the client modules 252A and/or the client module 252B, discussed above with respect to FIG. 2B. In some aspects, the process 2100 is performed by the communication server(s) 254, discussed above with respect to FIG. 2C.

After start operation 2105, process 2100 moves to operation 2110, which receives a request for communication status between a first account and a second account. As discussed above, the IB service 224 and/or 256 may implement a rest interface that provides for communication status between two accounts. The communication status is based on information barrier policies established as described above. The request is received, for example, from a client based communication application, as described above with respect to FIG. 2B. Alternatively, the request is received from a communication server, such as an instant messaging server, as described above in the example of FIG. 2C. In some aspects, the request message received in operation 2110 may include one or more of the fields discussed above with respect to FIG. 13A.

Operation 2120 determines whether the second account is included in a permitted account list (or an excluded account list) of the first account. For example, as discussed above, one or more permitted account lists for a particular account is established (e.g. 1536 and/or 1538) for an account identified via ADP policy ID 1532 and 1505 (at least in some embodiments).

In operation 2130, a response to the request is provided based on the determination. For example, the IB service 224 and/or 256 may respond within a REST interface indicating the communication status between the first account and second account. The client module 222A or client module 222B or an application that runs on one or more communication server(s) (e.g. 254) may then allow or block a communication from the first account to the second account based on the response. In some aspects, providing the response includes transmitting a message including the response to a device initiating the request of operation 2110. In some aspects, the response provided in operation 2130 may include one or more of the fields discussed above with respect to FIG. 13B. After operation 2130 completes, process 2100 moves to end operation 2150.

Figure 22:
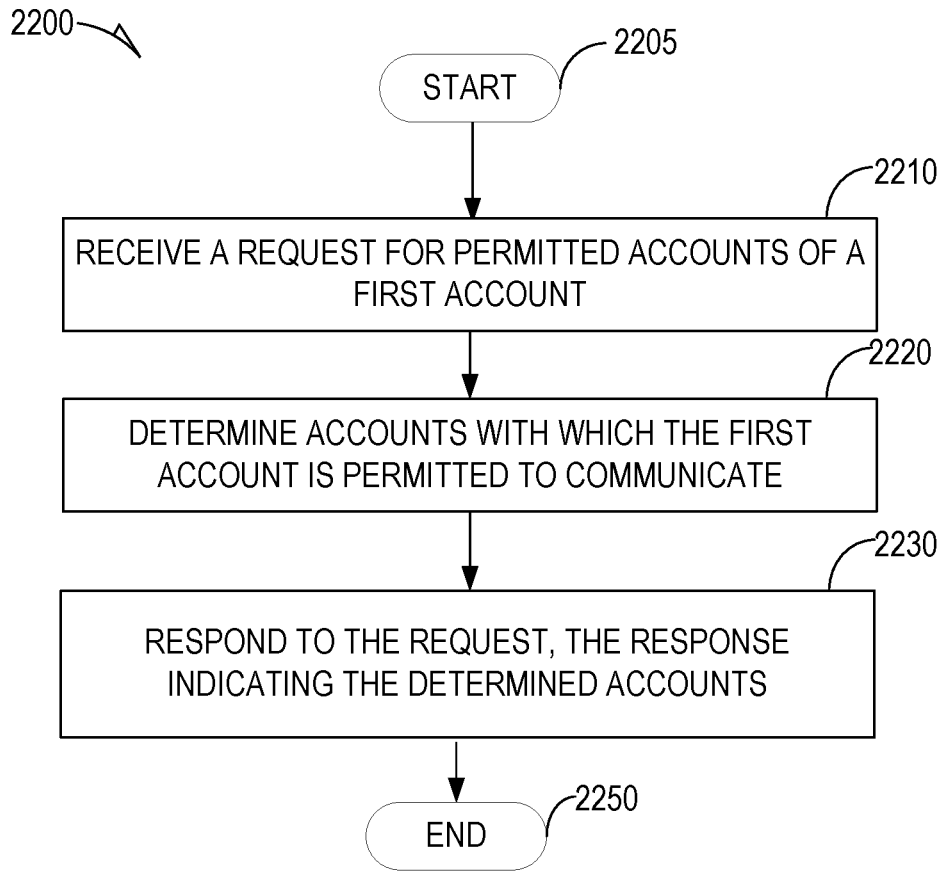
FIG. 22 is a flowchart of a method of responding to a query for IB information.

FIG. 22 is a flowchart of a method of responding to a query for information barrier information. In some aspects, one or more of the functions discussed below with respect to FIG. 22 and the process 2200 is performed by hardware processing circuitry. For example, the instructions 2424 discussed below in the memory 2404 and/or 2406 may configure the processor 2402 to perform one or more of the functions discussed below. In some aspects, the process 2200 discussed below is performed by the IB service 224 or IB service 256 discussed above with respect to FIGS. 2B and 2C respectively. In some aspects, process 2200 is performed by any of the client modules 222A-B, discussed above with respect to FIG. 2B. In some aspects, the process 2200 is performed by the communication server(s) 254, discussed above with respect to FIG. 2C.

After start operation 2205, process 2200 moves to operation 2210, which receives a request for a permitted account list of a first account. The received request requests a list of accounts with which the first account is permitted to communicate. The list of accounts is used, in some aspects, to indicate presence of these accounts to the first account in a user interface.

As discussed above, the IB service 224 and/or 256 may implement a rest interface that provides for a list of accounts with which the first account is permitted to communicate. The list of accounts is based on information barrier policies established as described above. The request is received, for example, from a client-based communication application, as described above with respect to FIG. 2B. Alternatively, the request is received from a communication server, such as an instant messaging server, as described above in the example of FIG. 2C. In some aspects, the request received in operation 2210 may include one or more of the fields discussed above with respect to message portion 1400 and FIG. 14A.

Operation 2220 determines the permitted accounts for the first account. For example, operation 2220 may identify the permitted accounts via an address book policy, by, for example, cross referencing an address book policy identifier associated with the account (e.g. 2205), and an address book policy data store (e.g. 2230). One or more permitted account lists is associated with the address book policy (e.g. 2236). One or more prohibited account lists is associated with the address book policy (e.g. 2238).

In operation 2230, a response to the request is provided based on the determination. For example, the IB service 224 and/or 256 may respond within a REST interface indicating the permitted account list for the first account. The client communication application (e.g. running the client module 222A or the client module 222B) or a communication server application (e.g. running on communication server(s) 254) may then display the permitted account list in a user interface of the first account. Providing the response may include generating the response and/or transmitting the response to a device that initiated the request of operation 2210. In various aspects, the response discussed above with respect to operation 2230 may include one or more of the fields discussed above with respect to message portion 1410 and FIG. 14B. After operation 2230 completes, process 2200 moves to end operation 2250.

Figure 23:
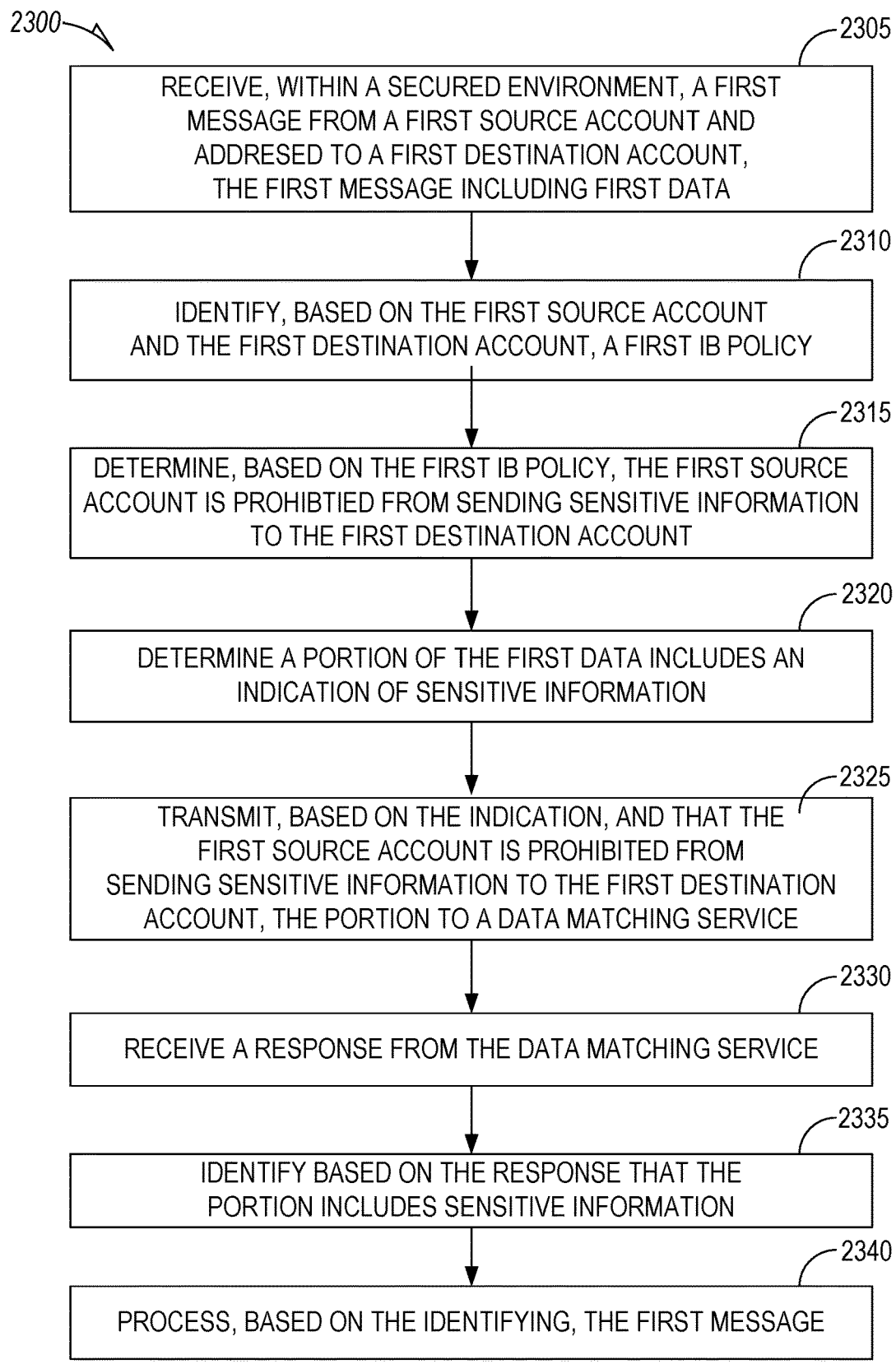
FIG. 23 is a flowchart of an example method of applying an IB policy with respect to sensitive information.

FIG. 23 is a flowchart of a method of applying an information barrier policy with regard to sensitive information. In some aspects, one or more of the functions discussed below with respect to FIG. 23 and the process 2300 is performed by hardware processing circuitry. For example, the instructions 2424 discussed below in the memory 2404 and/or 2406 may configure the processor 2402 to perform one or more of the functions discussed below. In some aspects, the process 2300 discussed below is performed by the IB service 224 or IB service 256 discussed above with respect to FIGS. 2B and 2C respectively. In some aspects, process 2300 is performed by any of the client modules 222A-B, discussed above with respect to FIG. 2B. In some aspects, the process 2300 is performed by the communication server(s) 254, discussed above with respect to FIG. 2C.

In operation 2305, a first message is received. The message indicates a source address of a first source account, and is addressed to a first destination account. The first message is addressed to the first destination account, in at least some embodiments, via a "To" field of the message. In some embodiments, a "from" field of the message indicates the first source account. The first message includes first data. The first data is, in some embodiments, an attachment to the first message, at least a portion of a body of the first message, or another part of the first message.

In operation 2310, a first information barrier policy is identified based on the first source account and the first destination account. For example, as discussed above with respect to FIG. 15, some embodiments identify a policy that applies to a particular account, such as the first source account. In some embodiments, an account record (e.g. 1500) identifies a policy to apply to the account (e.g. via ADP policy identifier field 1505). The policy identifies, in some embodiments, accessible accounts (e.g. via field 1536), inaccessible accounts (e.g. via 1538), and filtered accounts (e.g. via field 1539). Thus, in some embodiments, identifying a first information barrier policy includes identifying whether the first destination account is included on one or more of the account lists identified by fields 1536, 1538, or 1539.

In operation 2315, a determination is made that the first source account is prohibited from sending sensitive information to the first destination account. As discussed above, in some embodiments, operation 2315 includes identifying that the first destination account is included in the filtered address list identified by field 1539. Other embodiments identify the prohibition against sending sensitive information to the first destination account via alternate techniques. For example, if the first destination account is not included on an access list, the first source account is prohibited from sending any information to the first destination account. The access list is, in some embodiments, retrieved from an address book policy.

In operation 2320, a determination is made that at least a portion of the first data includes an indication of sensitive information. As discussed above, some embodiments evaluate a message or a portion of a message to determine whether the message or portion has an indicator of sensitive information. For example, some embodiments operate heuristics to look for indications of sensitive information. Some embodiments evaluate one or more regular expressions on the message portion (or entire message) to look for indications of sensitive information. As discussed above for example with respect to FIG. 1B and/or FIG. 1C, the DMC 108A or DMC 108B are employed, in some embodiments, to detect an indication of sensitive information. In some embodiments, the indication of sensitive information generally indicates a probability that the message or portion includes sensitive information. The probability is greater than zero, but less than one.

Thus, in some embodiments, to determine whether the portion or entire message includes sensitive information, a data matching service is utilized, which examines the portion against a database of known sensitive information. Some embodiments encrypt or at least has the portion before sending the portion to the data matching service. If no exact match is found between the portion and data used by the data matching service, then some embodiments determine the message does not include sensitive information.

In operation 2325, a search request is provided to a data matching service. In some embodiments, the data matching service is physically located on a different device than the device performing operation 2330. In this case, operation 2330 includes transmitting a network request to the data matching service. Providing the search request to the data matching service is conditional, in some embodiments, on the indication of sensitive information determined in operation 2320. In some embodiments, providing the search result includes transmitting a network message indicating the search request to the data matching service.

In operation 2330, a response is received from the data matching service. The response indicates whether an exact match of the portion was found in a database used as a basis by the data matching service (e.g. EDM search data store 125A or EDM search data store 125B). In some embodiments, the response in indicates there was an absence of sensitive information in the portion. In other embodiments, the response indicates that indeed there was sensitive information included in the portion.

In operation 2335, the response is decoded to identify that the portion does include sensitive information. In other words, in some embodiments, the data matching service searches a database for data matching the portion. If found, the response is sent to indicate same. Otherwise, the response indicates no match was found. In the specific situation described by process 2300, the response indicates a match was found by the data matching service. Since the match was found, operation 2335 determines that the portion includes sensitive information. Other embodiments of operation 2335 determine from the response that there was an absence of sensitive information in the portion.

In operation 2340, the first message is processed based on the response. In particular, if the response indicates the first message does not include sensitive information, some embodiments transmit the first message to the destination address of the message. If the response indicates the first message includes sensitive information, based on the information barrier policy indicating the first source account is prohibited from transmitting sensitive information to the first destination account, some embodiments block or otherwise inhibit sending of the first message to the first destination account.

In some embodiments, process 2300 anonymizes the first message if the response indicates it includes sensitive information. For example, in some embodiments, the response indicates specifically which sub-portion of the portion is the sensitive information. Process 2300 then, in some embodiments, anonymizes the identified sub-portion. In these embodiments, the first message, including the anonymized sub-portion, is then sent to the first destination account.

Some embodiments of process 2300 include receiving, within the secured environment, a second message. The second message has the first user account as a source account and the first destination account as a destination account. Thus, the second message is addressed to the first destination account. Process 2300 analyzes the second message to identify any possible indications of sensitive information. For example, as discussed above, process 2300 may analyze the second message with one or more heuristics, and/or regular expressions, to identify possible sensitive information included in the second message. If an indication of sensitive information is found, process 2300 invokes the data matching service to determine whether the indications of sensitive information identify actual sensitive information. Alternatively, the indications of sensitive information can be false positives, depending on the nature of the second message and/or accuracy of the heuristics used. If the indications are false positives, the matching service will be unable to locate matching data in its data store. A second response from the data matching service will indicate same.

Thus, based on the second response, process 2300 determines whether the second message includes or does not include sensitive information. If the second message does not include sensitive information, the second message is transmitted or otherwise communicated to the first destination account. Note that the communication of the second message in this case is partly premised on the first source account and second destination accounts being configured, via an information barrier policy, such that communication from the first source account to the first destination account is prohibited from including sensitive information, but otherwise such communication is permitted. The disclosed embodiments contemplate other information policies between the first source account and first destination account. For example, an alternative policy could indicate that no communication is permitted between these two accounts, even if no sensitive information is present. Another alternative policy could allow communication, even if sensitive information is present.

In some cases, a third message from the first source account to the first destination account does not include any indications of sensitive information. For example, process 2300 evaluates the third message using one or more heuristics, such as regular expressions, and does not identify any indications of sensitive information. Given the information barrier policy for communications from the first source account to the first destination account, in this circumstance, process 2300 communicates the third message to the first destination account.

In some embodiments, a fourth message is received. The fourth message is from a second source account and is addressed to (e.g., via a "To" field) to a second destination account. Process 2300 identifies an information barrier policy between the second source account and second destination account that permits communication between the two accounts, even if sensitive information is included. For example, such a policy may be in place if the second source account is an employee and the second destination account is the employee's supervisor. In this case, process 2300 does not, in some embodiments, check the fourth message for indications of sensitive information. This inhibiting of evaluating of the fourth message results in some savings in at least processor consumption when the information barrier policy does not select how a message is processed based on whether the message includes sensitive information. Further, when an information barrier policy does not condition processing of the fourth message on sensitive information, no request/response communication with a data matching service is necessary before disposing (e.g. forwarding to its destination) of the fourth message.

Some embodiments of process 2300 determine the first information barrier policy based on a group membership of one or more of the first source account and/or first destination account. For example, as discussed above with respect to FIGS. 1D and/or 1E, some embodiments may include policies that permit or prohibit a department of an organization (e.g. engineering) from communicating with another department within the organization (e.g. marketing). As discussed above, some embodiment maintain a mapping between individual accounts (e.g. the first source account or first destination account), and a group (e.g. engineering or marketing). As discussed above with respect to FIG. 15, one example embodiment maintains the group table 1510 to store such a mapping.

Figure 24:
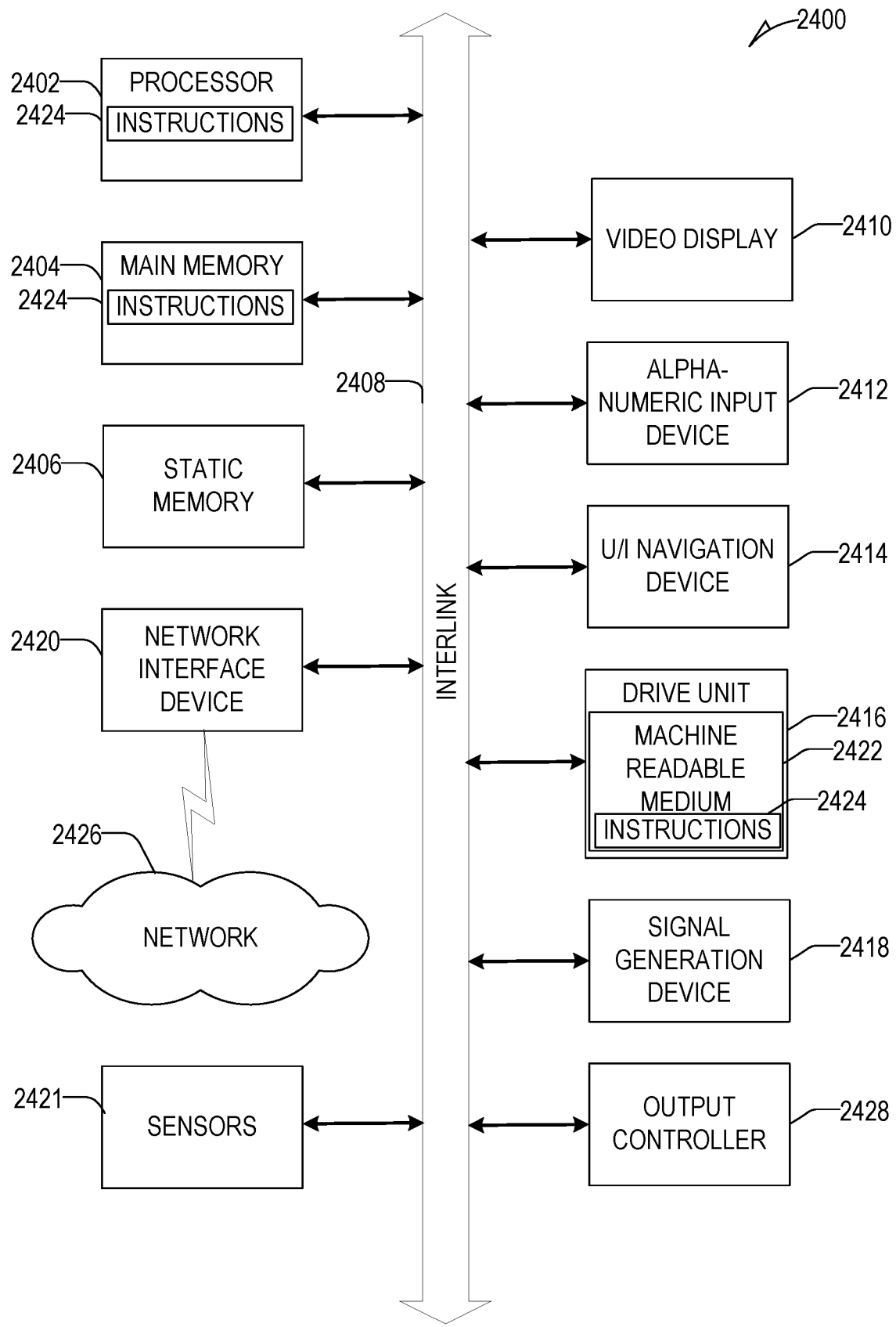
FIG. 24 illustrates a block diagram of an example machine upon which any one or more of the techniques (e.g., methodologies) discussed herein performs.

FIG. 24 illustrates a block diagram of an example machine 2400 upon which any one or more of the techniques (e.g., methodologies) discussed herein may perform. In alternative embodiments, the machine 2400 may operate as a standalone device or are connected (e.g., networked) to other machines. In a networked deployment, the machine 2400 may operate in the capacity of a server machine, a client machine, or both in server-client network environments. In an example, the machine 2400 may act as a peer machine in peer-to-peer (P2P) (or other distributed) network environment. The machine 2400 is a personal computer (PC), a tablet PC, a set-top box (STB), a personal digital assistant (PDA), a mobile telephone, a smart phone, a web appliance, a network router, switch or bridge, a server computer, a database, conference room equipment, or any machine capable of executing instructions (sequential or otherwise) that specify actions to be taken by that machine.

In various embodiments, machine 2400 may perform one or more of the processes described above with respect to FIGS. 1A-23 above. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms (all referred to hereinafter as "modules"). Modules are tangible entities (e.g., hardware) capable of performing specified operations and is configured or arranged in a certain manner. In an example, circuits are arranged (e.g., internally or with respect to external entities such as other circuits) in a specified manner as a module. In an example, the whole or part of one or more computer systems (e.g., a standalone, client or server computer system) or one or more hardware processors are configured by firmware or software (e.g., instructions, an application portion, or an application) as a module that operates to perform specified operations. In an example, the software may reside on a non-transitory computer readable storage medium or other machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor is configured as respective different modules at different times. Software may accordingly configure a hardware processor, for example, to constitute a particular module at one instance of time and to constitute a different module at a different instance of time.

Machine (e.g., computer system) 2400 may include a hardware processor 2402 (e.g., a central processing unit (CPU), a graphics processing unit (GPU), a hardware processor core, or any combination thereof), a main memory 2404 and a static memory 2406, some or all of which may communicate with each other via an interlink (e.g., bus) 2408. The machine 2400 may further include a display unit 2410, an alphanumeric input device 2412 (e.g., a keyboard), and a user interface (UI) navigation device 2414 (e.g., a mouse). In an example, the display unit 2410, input device 2412 and UI navigation device 2414 are a touch screen display. The machine 2400 may additionally include a storage device (e.g., drive unit) 2416, a signal generation device 2418 (e.g., a speaker), a network interface device 2420, and one or more sensors 2421, such as a global positioning system (GPS) sensor, compass, accelerometer, or other sensor. The machine 2400 may include an output controller 2428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 2416 may include a machine readable medium 2422 on which is stored one or more sets of data structures or instructions 2424 (e.g., software) embodying or utilized by any one or more of the techniques or functions described herein. The instructions 2424 may also reside, completely or at least partially, within the main memory 2404, within static memory 2406, or within the hardware processor 2402 during execution thereof by the machine 2400. In an example, one or any combination of the hardware processor 2402, the main memory 2404, the static memory 2406, or the storage device 2416 may constitute machine readable media.

While the machine readable medium 2422 is illustrated as a single medium, the term "machine readable medium" may include a single medium or multiple media (e.g., a centralized or distributed database, and/or associated caches and servers) configured to store the one or more instructions 2424.

The term "machine readable medium" may include any medium that is capable of storing, encoding, or carrying instructions for execution by the machine 2400 and that cause the machine 2400 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 2424 may further be transmitted or received over a communications network 2426 using a transmission medium via the network interface device 2420. The machine 2400 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 2420 may include one or more physical jacks (e.g., Ethernet, coaxial, or phone jacks) or one or more antennas to connect to the communications network 2426. In an example, the network interface device 2420 may include a plurality of antennas to wirelessly communicate using at least one of single-input multiple-output (SIMO), multiple-input multiple-output (MIMO), or multiple-input single-output (MISO) techniques. In some examples, the network interface device 2420 may wirelessly communicate using Multiple User MIMO techniques.

Examples, as described herein, may include, or may operate on, logic or a number of components, modules, or mechanisms. Modules are tangible entities (e.g., hardware) capable of performing specified operations and are configured or arranged in a certain manner. In an example, circuits are arranged (e.g., internally or with respect to external entities such as other circuits) in a specified manner as a module. In an example, the whole or part of one or more computer systems (e.g., a standalone, client, or server computer system) or one or more hardware processors are configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Example 1 is a non-transitory computer readable storage medium comprising instructions that when executed configure hardware processing circuitry to perform operations comprising: receiving, within a secured environment, a first message from a first source account and addressed to a first destination account, the first message including first data; identifying, based on the first source account and the first destination account, a first information barrier policy; determining, based on the first information barrier policy, the first source account is prohibited from sending sensitive information to the first destination account; determining a portion of the first data includes an indication of sensitive information; transmitting, based on the indication of sensitive information and that the first source account is prohibited from sending sensitive information to the first destination account, the portion to a data matching service device; receiving a response from the data matching service device; identifying, based on the response, that the portion includes sensitive information; and processing, based on the identifying, the first message.

In Example 2, the subject matter of Example 1 optionally includes wherein processing the first message comprising blocking, based on the identifying, transmission of the first message to the first destination account.

In Example 3, the subject matter of any one or more of Examples 1-2 optionally include wherein processing the first message comprises: anonymizing, based on the identifying and the first information barrier policy, the sensitive information in the first message; and transmitting, based on the anonymizing, the first message to the first destination account.

In Example 4, the subject matter of any one or more of Examples 1-3 optionally include the operations further comprising: receiving, within the secured environment, a second message from the first source account and addressed to the first destination account, the second message including second data; determining a second portion of the second data includes an indication of sensitive information; transmitting, based on the indication of sensitive information and that the first source account is prohibited from sending sensitive information to the first destination account, the second portion to the data matching service device; receiving a second response from the data matching service device; identifying, based on the second response, that the second portion does not include sensitive information; and transmitting, based on the second portion not including sensitive information, the second message to the first destination account.

In Example 5, the subject matter of any one or more of Examples 1-4 optionally include the operations further comprising: receiving, within the secured environment, a second message from the first source account and addressed to the first destination account, the second message including second data; determining an absence of sensitive information in the second data; inhibiting transmission, based on the absence, of the second data to the data matching service device; and transmitting, based on the absence, the second message to the first destination account.

In Example 6, the subject matter of any one or more of Examples 1-5 optionally include the operations further comprising: receiving, within the secured environment, a second message from a second source account and addressed to a second destination account, the second message including second data; identifying, based on the second source account and the second destination account, a second information barrier policy; determining, based on the second information barrier policy, the second source account is permitted to send sensitive information to the first destination account; inhibiting transmission, based on the second source account being permitted to send sensitive information to the second destination account, of second data to the data matching service device; and transmitting, based on the second source account being permitted to send sensitive information to the second destination account, the second message to the second destination account.

In Example 7, the subject matter of any one or more of Examples 1-6 optionally include wherein the determining that the portion includes the indication of sensitive information comprises evaluating a regular expression on the portion or identifying a keyword in the portion.

In Example 8, the subject matter of any one or more of Examples 1-7 optionally include wherein the data matching service device is configured to compare the portion to second data in a data store, and to determine, based on the comparison, the portion includes sensitive information.

In Example 9, the subject matter of Example 8 optionally includes wherein the data matching service device is configured to determine the portion includes sensitive information if the portion exactly matches the second data.

In Example 10, the subject matter of any one or more of Examples 1-9 optionally include the operations further comprising hashing or encrypting the portion before transmitting the portion to the data matching service device.

In Example 11, the subject matter of any one or more of Examples 1-10 optionally include the operations further comprising: determining a first group membership of the first source account; determining a second group membership of the first destination account, wherein the first information barrier policy is identified based on the first group membership and the second group membership.

In Example 12, the subject matter of any one or more of Examples 1-11 optionally include wherein the determining the first source account is prohibited from sending sensitive information to the first destination account comprises determining that the first destination account is not identified on an access list of the first source account.

In Example 13, the subject matter of Example 12 optionally includes wherein the access list is retrieved from an address book policy.

In Example 14, the subject matter of Example 13 optionally includes wherein the address book policy is a Microsoft Active Directory address book policy.

Example 15 is a system, comprising: hardware processing circuitry; one or more hardware memories storing instructions that when executed configure the hardware processing circuitry to perform operations comprising: receiving, within a secured environment, a first message from a first source account and addressed to a first destination account, the first message including first data; identifying, based on the first source account and the first destination account, a first information barrier policy; determining, based on the first information barrier policy, the first source account is prohibited from sending sensitive information to the first destination account; determining a portion of the first data includes an indication of sensitive information; transmitting, based on the indication of sensitive information and that the first source account is prohibited from sending sensitive information to the first destination account, the portion to a data matching service device; receiving a response from the data matching service device; identifying, based on the response, that the portion includes sensitive information; and processing, based on the identifying, the first message.

In Example 16, the subject matter of Example 15 optionally includes wherein processing the first message comprising blocking, based on the identifying, transmission of the first message to the first destination account.

In Example 17, the subject matter of any one or more of Examples 15-16 optionally include wherein processing the first message comprises: anonymizing, based on the identifying and the first information barrier policy, the sensitive information in the first message; and transmitting, based on the anonymizing, the first message to the first destination account.

In Example 18, the subject matter of any one or more of Examples 15-17 optionally include the operations further comprising: receiving, within the secured environment, a second message from the first source account and addressed to the first destination account, the second message including second data; determining a second portion of the second data includes an indication of sensitive information; transmitting, based on the indication of sensitive information and that the first source account is prohibited from sending sensitive information to the first destination account, the second portion to the data matching service device; receiving a second response from the data matching service device; identifying, based on the second response, that the second portion does not include sensitive information; and transmitting, based on the second portion not including sensitive information, the second message to the first destination account.

In Example 19, the subject matter of any one or more of Examples 15-18 optionally include the operations further comprising: receiving, within the secured environment, a second message from the first source account and addressed to the first destination account, the second message including second data; determining an absence of sensitive information in the second data; inhibiting transmission, based on the absence, of the second data to the data matching service device; and transmitting, based on the absence, the second message to the first destination account.

In Example 20, the subject matter of any one or more of Examples 15-19 optionally include the operations further comprising: receiving, within the secured environment, a second message from a second source account and addressed to a second destination account, the second message including second data; identifying, based on the second source account and the second destination account, a second information barrier policy; determining, based on the second information barrier policy, the second source account is permitted to send sensitive information to the first destination account; inhibiting transmission, based on the second source account being permitted to send sensitive information to the second destination account, of second data to the data matching service device; and transmitting, based on the second source account being permitted to send sensitive information to the second destination account, the second message to the second destination account.

In Example 21, the subject matter of any one or more of Examples 15-20 optionally include wherein the determining that the portion includes the indication of sensitive information comprises evaluating a regular expression on the portion or identifying a keyword in the portion.

In Example 22, the subject matter of any one or more of Examples 15-21 optionally include wherein the data matching service device is configured to compare the portion to second data in a data store, and to determine, based on the comparison, the portion includes sensitive information.

In Example 23, the subject matter of Example 22 optionally includes wherein the data matching service device is configured to determine the portion includes sensitive information if the portion exactly matches the second data.

In Example 24, the subject matter of any one or more of Examples 15-23 optionally include the operations further comprising hashing or encrypting the portion before transmitting the portion to the data matching service device.

In Example 25, the subject matter of any one or more of Examples 15-24 optionally include the operations further comprising: determining a first group membership of the first source account; determining a second group membership of the first destination account, wherein the first information barrier policy is identified based on the first group membership and the second group membership.

In Example 26, the subject matter of any one or more of Examples 15-25 optionally include wherein the determining the first source account is prohibited from sending sensitive information to the first destination account comprises determining that the first destination account is not identified on an access list of the first source account.

In Example 27, the subject matter of Example 26 optionally includes wherein the access list is retrieved from an address book policy.

In Example 28, the subject matter of Example 27 optionally includes wherein the address book policy is a Microsoft Active Directory address book policy.

Example 29 is a method, comprising: receiving, within a secured environment, a first message from a first source account and addressed to a first destination account, the first message including first data; identifying, based on the first source account and the first destination account, a first information barrier policy; determining, based on the first information barrier policy, the first source account is prohibited from sending sensitive information to the first destination account; determining a portion of the first data includes an indication of sensitive information; transmitting, based on the indication of sensitive information and that the first source account is prohibited from sending sensitive information to the first destination account, the portion to a data matching service device; receiving a response from the data matching service device; identifying, based on the response, that the portion includes sensitive information; and processing, based on the identifying, the first message.

In Example 30, the subject matter of Example 29 optionally includes wherein processing the first message comprising blocking, based on the identifying, transmission of the first message to the first destination account.

In Example 31, the subject matter of any one or more of Examples 29-30 optionally include wherein processing the first message comprises: anonymizing, based on the identifying and the first information barrier policy, the sensitive information in the first message; and transmitting, the anonymized sensitive information to the first destination account.

In Example 32, the subject matter of any one or more of Examples 29-31 optionally include receiving, within the secured environment, a second message from the first source account and addressed to the first destination account, the second message including second data; determining a second portion of the second data includes an indication of sensitive information; transmitting, based on the indication of sensitive information and that the first source account is prohibited from sending sensitive information to the first destination account, the second portion to the data matching service device; receiving a second response from the data matching service device; identifying, based on the second response, that the second portion does not include sensitive information; and transmitting, based on the second portion not including sensitive information, the second message to the first destination account.

In Example 33, the subject matter of any one or more of Examples 29-32 optionally include receiving, within the secured environment, a second message from the first source account and addressed to the first destination account, the second message including second data; determining an absence of sensitive information in the second data; inhibiting transmission, based on the absence, of the second data to the data matching service device; and transmitting, based on the absence, the second message to the first destination account.

In Example 34, the subject matter of any one or more of Examples 29-33 optionally include receiving, within the secured environment, a second message from a second source account and addressed to a second destination account, the second message including second data; identifying, based on the second source account and the second destination account, a second information barrier policy; determining, based on the second information barrier policy, the second source account is permitted to send sensitive information to the first destination account; inhibiting transmission, based on the second source account being permitted to send sensitive information to the second destination account, of second data to the data matching service device; and transmitting, based on the second source account being permitted to send sensitive information to the second destination account, the second message to the second destination account.

In Example 35, the subject matter of any one or more of Examples 29-34 optionally include wherein the determining that the portion includes the indication of sensitive information comprises evaluating a regular expression on the portion or identifying a keyword in the portion.

In Example 36, the subject matter of any one or more of Examples 29-35 optionally include wherein the data matching service device is configured to compare the portion to second data in a data store, and to determine, based on the comparison, the portion includes sensitive information.

In Example 37, the subject matter of Example 36 optionally includes wherein the data matching service device is configured to determine the portion includes sensitive information if the portion exactly matches the second data.

In Example 38, the subject matter of any one or more of Examples 29-37 optionally include hashing or encrypting the portion before transmitting the portion to the data matching service device.

In Example 39, the subject matter of any one or more of Examples 29-38 optionally include determining a first group membership of the first source account; determining a second group membership of the first destination account, wherein the first information barrier policy is identified based on the first group membership and the second group membership.

In Example 40, the subject matter of any one or more of Examples 29-39 optionally include wherein the determining the first source account is prohibited from sending sensitive information to the first destination account comprises determining that the first destination account is not identified on an access list of the first source account.

In Example 41, the subject matter of Example 40 optionally includes wherein the access list is retrieved from an address book policy.

In Example 42, the subject matter of Example 41 optionally includes wherein the address book policy is a Microsoft Active Directory address book policy.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor is configured as respective different modules at different times. Software may accordingly configure a hardware processor, for example, to constitute a particular module at one instance of time and to constitute a different module at a different instance of time.

Various embodiments are implemented fully or partially in software and/or firmware. This software and/or firmware may take the form of instructions contained in or on a non-transitory computer-readable storage medium. Those instructions may then be read and executed by one or more processors to enable performance of the operations described herein. The instructions are in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory; etc.

We claim:

1. A non-transitory computer readable storage medium comprising instructions that when executed configure hardware processing circuitry to perform operations comprising:
receiving, within a secured environment, a first message from a first source account and addressed to a first destination account, the first message including first data;
identifying, based on the first source account and the first destination account, a first information harrier policy;
determining, based on the first information barrier policy, the first source account is prohibited from sending sensitive information to the first destination account;
responsive to determining the first source account is prohibited from sending sensitive information to the first destination account, determining, by a data match classifier (DMC), a portion of the first data includes an indication of sensitive information;
transmitting, based on the indication of sensitive information and that the first source account is prohibited from sending sensitive information to the first destination account, the portion to a data matching service device;
receiving a response from the data matching service device;
identifying, based on the response, that the portion includes sensitive information; and
processing, based on the identifying, the first message.

2. The non-transitory computer readable storage medium of claim 1, wherein processing the first message comprising blocking; based on the identifying, transmission of the first message to the first destination account.

3. The non-transitory computer readable storage medium of claim 1, wherein processing the first message comprises:
anonymizing, based on the identifying and the first information barrier policy, the sensitive information in the first message; and
transmitting the anonymized sensitive information to the first destination account.

4. The non-transitory computer readable storage medium of claim 1, the operations further comprising:
receiving, within the secured environment, a second message from the first source account and addressed to the first destination account, the second message including second data;
determining a second portion of the second data includes an indication of sensitive information;
transmitting, based on the indication of sensitive information and that the first source account is prohibited from sending sensitive information to the first destination account, the second portion to the data matching service device;
receiving a second response from the data matching service device;
identifying, based on the second response, that the second portion does not include sensitive information; and
transmitting, based on the second portion not including sensitive information, the second message to the first destination account.

5. The non-transitory computer readable storage medium of claim 1, the operations further comprising:
receiving, within the secured environment, a second message from the first source account and addressed to the first destination account, the second message including second data;
determining an absence of sensitive information in the second data;
inhibiting transmission, based on the absence, of the second data to the data matching service device; and
transmitting, based on the absence, the second message to the first destination account.

6. The non-transitory computer readable storage medium of claim 1, the operations further comprising:
receiving, within the secured environment, a second message from a second source account and addressed to a second destination account, the second message including second data;
identifying, based on the second source account and the second destination account, a second information barrier policy;
determining, based on the second information barrier policy, the second source account is permitted to send sensitive information to the first destination account;
inhibiting transmission, based on the second source account being permitted to send sensitive information to the second destination account, of second data to the data matching service device; and transmitting, based on the second source account being permitted to send sensitive information to the second destination account, the second message to the second destination account.

7. The non-transitory computer readable storage medium of claim 1, wherein the determining that the portion includes the indication of sensitive information comprises evaluating a regular expression on the portion or identifying a keyword in the portion.

8. The non-transitory computer readable storage medium of claim 1, wherein the data matching service device is configured to compare the portion to second data in a data store, and to determine, based on the comparison, the portion includes sensitive information.

9. The non-transitory computer readable storage medium of claim 8, wherein the data matching service device is configured to determine the portion includes sensitive information if the portion exactly matches the second data.

10. The non-transitory computer readable storage medium of claim 1, the operations further comprising hashing or encrypting the portion before transmitting the portion to the data matching service device.

11. The non-transitory computer readable storage medium of claim 1, the operations further comprising:
determining a first group membership of the first source account;
determining a second group membership of the first destination account, wherein the first information barrier policy is identified based on the first group membership and the second group membership.

12. A method performed by hardware processing circuitry, comprising:
receiving, within a secured environment, a first message from a first source account and addressed to a first destination account, the first message including first data;
identifying, based on the first source account and the first destination account, a first information barrier policy;
determining, based on the first information barrier policy, the first source account is prohibited from sending sensitive information to the first destination account;
responsive to determining the first source account is prohibited from sending sensitive information to the first destination account, determining, by a data match classifier (DMC), a portion of the first data includes an indication of sensitive information;
transmitting, based on the indication of sensitive information and that the first source account is prohibited from sending sensitive information to the first destination account, the portion to a data matching service device;
receiving a response from the data matching service device;
identifying, based on the response, that the portion includes sensitive information; and
processing, based on the identifying, the first message.

13. The method of claim 12, further comprising:
receiving, within the secured environment, a second message from the first source account and addressed to the first destination account, the second message including second data;
determining a second portion of the second data includes an indication of sensitive information;
transmitting, based on the indication of sensitive information and that the first source account is prohibited from sending sensitive information to the first destination account, the second portion to the data matching service device;

receiving a second response from the data matching service device;

identifying, based on the second response; that the second portion does not include sensitive information; and transmitting, based on the second portion not including sensitive information, the second message to the first destination account.

14. The method of claim 12, further comprising:

receiving, within the secured environment, a second message from the first source account and addressed to the first destination account, the second message including second data;

determining an absence of sensitive information in the second data;

inhibiting transmission, based on the absence, of the second data to the data matching service device; and transmitting, based on the absence, the second message to the first destination account.

15. The method of claim 12, further comprising:

receiving, within the secured environment, a second message from a second source account and addressed to a second destination account, the second message including second data;

identifying, based on the second source account and the second destination account, a second information barrier policy;

determining, based on the second information barrier policy, the second source account is permitted to send sensitive information to the first destination account;

inhibiting transmission, based on the second source account being permitted to send sensitive information to the second destination account, of second data to the data matching service device; and transmitting, based on the second source account being permitted to send sensitive information to the second destination account, the second message to the second destination account.

16. A system, comprising:

hardware processing circuitry;

one or more hardware memories storing instructions that when executed, cause the hardware processing circuitry to perform operations comprising:

receiving, within a secured environment, a first message from a first source account and addressed to a first destination account, the first message including first data;

identifying, based on the first source account and the first destination account, a first information barrier policy;

determining, based on the first information barrier policy, the first source account is prohibited from sending sensitive information to the first destination account;

responsive to determining the first source account is prohibited from sending sensitive information to the first destination account determining, by a data match classifier (DMC), a portion of the first data includes an indication of sensitive information;

transmitting, based on the indication of sensitive information and that the first source account is prohibited from sending sensitive information to the first destination account, the portion to a data matching service device;

receiving a response from the data matching service device;

identifying; based on the response, that the portion includes sensitive information; and processing, based on the identifying, the first message.

17. The system of claim 16, wherein the determining that the portion includes the indication of sensitive information comprises evaluating a regular expression on the portion or identifying a keyword in the portion.

18. The system of claim 16, wherein the data matching service device is configured to compare the portion to second data in a data store, and to determine, based on the comparison, the portion includes sensitive information.

19. The system of claim 18, wherein the data matching service device is configured to determine the portion includes sensitive information if the portion exactly matches the second data.

20. The system of claim 16, the operations further comprising:

determining a first group membership of the first source account;

determining a second group membership of the first destination account, wherein the first information barrier policy is identified based on the first group membership and the second group membership.

* * * * *